US008385629B2

(12) United States Patent
Chen et al.

(10) Patent No.: US 8,385,629 B2
(45) Date of Patent: Feb. 26, 2013

(54) METHOD FOR ACQUIRING PHASE INFORMATION AND SYSTEM FOR MEASURING THREE DIMENSIONAL SURFACE PROFILES

(75) Inventors: Liang-Chia Chen, Taipei County (TW); Hsuan-Wei Ho, Taipei (TW)

(73) Assignee: National Taipei University of Technology, Taipei (TW)

( * ) Notice: Subject to any disclaimer, the term of this patent is extended or adjusted under 35 U.S.C. 154(b) by 878 days.

(21) Appl. No.: 12/511,260

(22) Filed: Jul. 29, 2009

(65) Prior Publication Data
US 2010/0189372 A1 Jul. 29, 2010

(30) Foreign Application Priority Data

Jan. 23, 2009 (TW) .............................. 98102814 A

(51) Int. Cl.
*G06K 9/00* (2006.01)
*G06K 9/76* (2006.01)
*G06K 9/62* (2006.01)
*G06K 9/40* (2006.01)

(52) U.S. Cl. ........ 382/154; 382/141; 382/210; 382/215; 382/260

(58) Field of Classification Search .................. 382/141, 382/154, 210–215, 260
See application file for complete search history.

(56) References Cited

U.S. PATENT DOCUMENTS

| | | | | |
|---|---|---|---|---|
| 4,969,106 A | * | 11/1990 | Vogel et al. | 382/108 |
| 5,642,293 A | * | 6/1997 | Manthey et al. | 702/42 |
| 6,128,405 A | * | 10/2000 | Fujii | 382/154 |
| 6,389,154 B1 | * | 5/2002 | Stam | 382/108 |
| 7,024,343 B2 | * | 4/2006 | El-Ratal | 703/6 |
| 7,456,842 B2 | * | 11/2008 | Kosolapov | 345/589 |
| 2009/0238470 A1 | * | 9/2009 | Ives et al. | 382/210 |

OTHER PUBLICATIONS

Cédric Bréluzeau(a), Alain Bosseboeuf(a), Sylvain Petitgrand(b), Xavier Leroux(a), Automated fringe-pattern extrapolation for patterned surface profiling by interference microscopy with Fourier transform analysis, Institut d'Electronique Fondamentale, UMR CNRS 8822, Université Paris XI, 91405 Orsay, France, Fogale Nanotech, Parc Kennedy, 285 rue Gilles Roberval, 30000 Nimes, France.

* cited by examiner

*Primary Examiner* — Wesley Tucker
(74) *Attorney, Agent, or Firm* — WPAT PC; Justin King

(57) ABSTRACT

The present invention provides a band-pass filter, being capable of fitting a frequency spectrum area having phase information in a frequency spectrum image, to obtain a spectrum information corresponding to the phase information during the process of obtaining the phase information from the frequency spectrum image with respect to an object's surface profile. In another embodiment, the present invention further provides a method to optimize the spectrum range of the band-pass filter so as to enhance measuring accuracy and efficiency while restoring the surface of the object. In addition, by employing the foregoing method, the present invention further provides a measurement system for measuring three-dimensional surface shapes in which a deformed fringe pattern with respect to the measured object's surface is acquired and the phase information is obtained from the fringe pattern according to the foregoing method so as to restore the surface profile of the measured object.

15 Claims, 35 Drawing Sheets

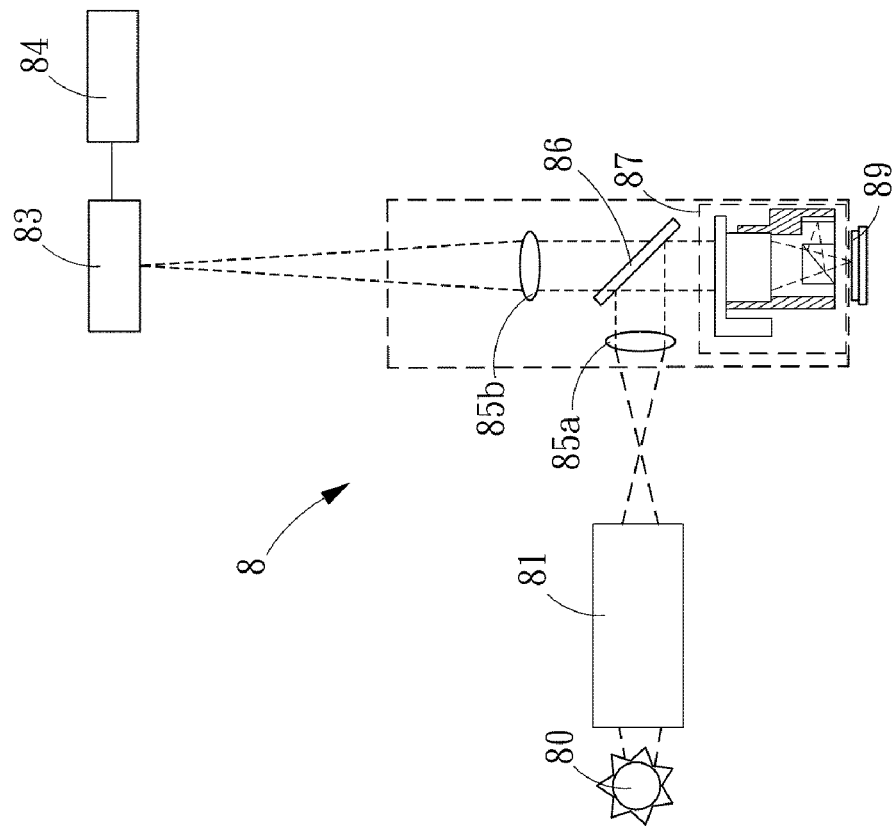
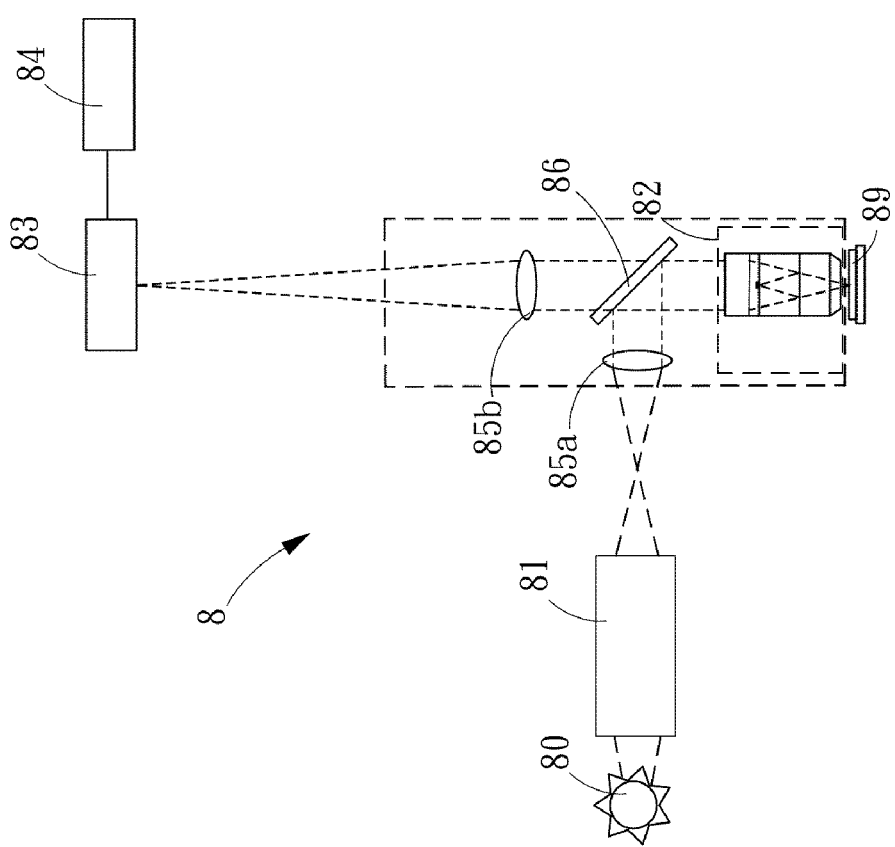
FIG. 9D
FIG. 9C

METHOD FOR ACQUIRING PHASE INFORMATION AND SYSTEM FOR MEASURING THREE DIMENSIONAL SURFACE PROFILES

FIELD OF THE INVENTION

The present invention relates to a technique for acquiring phase information, and more particularly, to a phase information acquiring method and a three-dimensional surface profile measurement system, which extracts the spectrum information corresponding to phase information necessary for phase unwrapping procedure from the frequency spectrum area by employing a band-pass filter that is capable of fitting the contour of frequency spectrum area having the phase information.

BACKGROUND OF THE INVENTION

With rapid advance in technology along with the development in industrial production, the demands for better precision on surface profilometry with respect to geometrical sizes, surface roughness and free-form surfaces is even increasing. However, since the measurements of all those surface profilometry techniques currently available are easily affected by environment disturbances and thus causing undesired errors in the measurements, it is in urgent needs of improved real-time three-dimensional surface profilometry techniques.

There are already many studies relating to such improved real-time three-dimensional surface profilometry techniques. One of which is a three-dimensional surface profilometry technique disclosed in U.S. Pat. No. 4,768,881, entitled "Method and apparatus for processing holographic interference patterns using Fourier-transforms". Operationally, after projecting a fringe pattern onto an object to be measured, the object is first being imaged by a square-shaped imaging unit for obtaining an spatial image including only the portion of the object in the square area defined by the imaging unit, and then the so-obtained spatial image of the object is transformed into a frequency-domain image which is then being filtered by a band-pass filter for obtaining phase information relating to the frequency-domain image to be further used for reconstructing the three-dimensional surface profile of the object.

Moreover, there is another prior-art surface profilometry method disclosed by Cedric Breluzeau, et al. in "Automated fringe-pattern extrapolation for patterned surface profiling by interference microscopy with Fourier transform analysis', Proceedings of SPIE, vol. 5858, 2005, which uses an adjustable band-pass filter to set a threshold value for the purpose of achieving optimal filtering while preventing causing any measurement error in the intended three-dimensional surface reconstruction. Although different filter shapes in the Fourier space were tested for the determination of valid areas in the interferogram, only the neighboring areas with the most significant spectral signals are selected to be the valid areas by those filters of different shapes. Thus, it does not extract the entire vital spectrum precisely required for accurate phase information reconstruction. Therefore, there may be distortion in the reconstructed surface profile basing upon the aforesaid methods, which is especially true for reconstructing those objects with sharp edges.

It is noted that all the aforesaid surface profilometry measurement techniques use a band-pass filter as a means for defining a valid area in a frequency spectrum of a deformed structured fringe pattern and thus obtaining phase information from the valid area to be used in a calculation for reconstructing surface profile of the object. However, as the valid area defined by the conventional band-pass filters, such as 2-D Hanning filter or circular band-pass filters, used in the aforesaid surface profilometry measurement techniques fails to include all the spectrum areas containing vital phase information of the object's surface profile, the reconstructed surface profile of the object resulting from the foregoing reconstruction calculations may deviate from the actual surface profile of the object in size or in shape which severely affects the accuracy of the surface profilometry. Please refer to FIG. 1A to FIG. 1G, which show various reconstructed images of a ball-shaped object relating to different stages in a surface reconstruction process using a conventional circular band-pass filter. FIG. 1A is a spatial domain image (deformed structured fringe pattern) of a ball-shaped object using fringe projection. FIG. 1B is a frequency domain image obtained by performing a Fourier transformation upon the image of FIG. 1A. FIG. 1C shows a spectrum information which is obtained by circular band-pass filtering the area in the image of FIG. 1B within the +1 order and −1 order frequency spectrum areas. FIG. 1D is an image obtained by performing an inverse Fourier transformation upon the spectrum information of FIG. 1C. For reconnecting the phase discontinuities in the image of FIG. 1D, a Euler transformation and a phase unwrapping process is performed upon the image of FIG. 1D for achieving a continuous phase distribution, as shown in FIG. 1E. Using the information of continuous phase distribution in FIG. 1E, the surface profile of the ball-shaped object can be reconstructed, as the reconstructed three-dimensional image shown in FIG. 1F and a cross-sectional image of the profile illustrated in FIG. 1G.

Please refer to FIG. 1H to FIG. 1L, which show various reconstructed images of a ball-shaped object relating to different stages in a phase unwrapping process using another conventional circular band-pass filter disclosed by Cédric Bréluzeau, et al. FIG. 1H shows an overlapping step-height precision gauge blocks and FIG. 1I is a spatial domain fringe pattern image of the block structure of FIG. 1H. FIG. 1J is a frequency domain image obtained by performing a Fourier transformation upon the image of FIG. 1I. After circular band-pass filtering the area in the image of FIG. 1J for obtaining a spectrum image and then performing an inverse Fourier transformation upon the spectrum information, a Euler transformation and a phase unwrapping process is performed upon the Fourier-inversed image, the surface profile of the overlapping step-height gauge block can be reconstructed, as the reconstructed three-dimensional image shown in FIG. 1K and the cross-sectional image of FIG. 1L. In FIG. 1L, by the reconstruction resulting from the aforesaid conventional circular band-pass filter, the edges between each blocks in reconstructed image of the step-height block are rounded like arcs and not longer preserve the right angles in the original structure.

Therefore, it is in need of a method for acquiring phase information and relating system for measuring three-dimensional surface profile that are free from the aforesaid shortcomings.

SUMMARY OF THE INVENTION

The present invention provides a method for acquiring phase information, which functions to extract a spectrum information with respect to the phase information from a frequency spectrum area by a band-pass filter being capable of fitting the contour of the frequency spectrum area, and then restores the phase information with respect to the object surface profile by performing calculation upon the spectrum information so as to reconstruct the surface shape of the object according to the phase information, wherein the filter is substantially an oval-shaped band-pass filter for extracting the spectrum information from the frequency spectrum area completely so as to minimize the potential measurement errors while reconstructing the surface shape.

The present invention provides a system for measuring three-dimensional surface shapes, which acquires a deformed structured fringe image with respect to an object's surface and transforms the deformed structured fringe image into a frequency spectrum image. In the system, a filter is utilized to extract a spectrum information corresponding to a phase information from a frequency spectrum area in the frequency spectrum image, and then an algorithm is utilized to restore the phase information with respect to the surface shape of the object, wherein the shape of the filter is fitted to the contour of the frequency spectrum area.

The present invention provides a system for measuring three-dimensional surface shape, which produces a fringe image by means of a structured light or by interference and transforms the fringe image into a frequency spectrum image so that a spectrum information corresponding to phase information can be extracted from the frequency spectrum image. The system of the present invention is capable of obtaining the phase information with respect to the surface shape of the object by analyzing one single fringe image so that it is time-efficient comparing with the conventional multi-steps phase-shift interferometry as well as the potential error of restoring information caused by undesired environmental vibration during the detecting process of the multi-steps phase-shift inteferometry can also be avoided or minimized.

In one embodiment of the present invention, the present invention provides a method for acquiring phase information comprising the steps of: obtaining a deformed fringe image related to a phase information with respect to surface shape information of an object; acquiring a frequency spectrum image with respect to the fringe image, wherein the frequency spectrum image has a frequency spectrum area corresponding to the phase information with respect to the surface shape information of the object and having a primary spectrum region and a secondary spectrum region distributed extending from two sides of the primary spectrum region respectively toward the sides of the frequency spectrum image; extracting a spectrum information from the primary spectrum region and the secondary spectrum region by employing a filter shaped to cover the primary and the secondary spectrum regions; and obtaining the corresponding phase information by performing a calculation upon the spectrum information.

In another embodiment, the present invention further provides a system for measuring three-dimensional surface shape, comprising: a projection unit, for projecting a structured light onto an object; an image acquiring device, for acquiring a deformed fringe image having a phase information with respect to surface shape information of an object; and a control unit, coupled to the image acquiring device for processing the fringe image so as to obtain a frequency spectrum image, which has a frequency spectrum area corresponding to a phase information with respect to the surface shape information of the object and has a primary spectrum region and a secondary spectrum region distributed extending from two sides of the primary spectrum region respectively toward the sides of the frequency spectrum image, extracting a spectrum information from the primary spectrum region and the secondary spectrum region by employing a filter shaped to cover the primary and the secondary spectrum regions, and then obtaining the corresponding phase information by performing a calculation upon the spectrum information.

In another embodiment, the present invention further provides a system for measuring three-dimensional surface shape, comprising: a light projection unit, for providing a light field; a light modulation unit, for modulating the light field into a reference beam and a detection beam and projecting the detection beam onto an object so that an object beam containing the phase information with respect to the surface shape information of the object is interfered with the reference beam, thereby forming an interference beam; an image acquiring device, for detecting the interference beam so as to form a fringe image; and a control unit, coupled to the image acquiring device for processing the fringe image so as to obtain a frequency spectrum image, which has a frequency spectrum area corresponding to a phase information with respect to the surface shape information of the object and has a primary spectrum region and a secondary spectrum region distributed extending from two sides of the primary spectrum region respectively toward the sides of the frequency spectrum image, extracting a spectrum information from the primary spectrum region and the secondary spectrum region by employing a filter shaped to cover the primary and the secondary spectrum regions, and then obtaining the corresponding phase information by performing a calculation upon the spectrum information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 9C illustrates an embodiment for generating interferometric fringe images by optical interference in the system shown in FIG. 9A for measuring three-dimensional surface shape of the present invention.

FIG. 9D illustrates an embodiment for generating interferometric fringe images by optical interference in the system shown in FIG. 9B for measuring three-dimensional surface shape of the present invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as follows.

Figure 2:
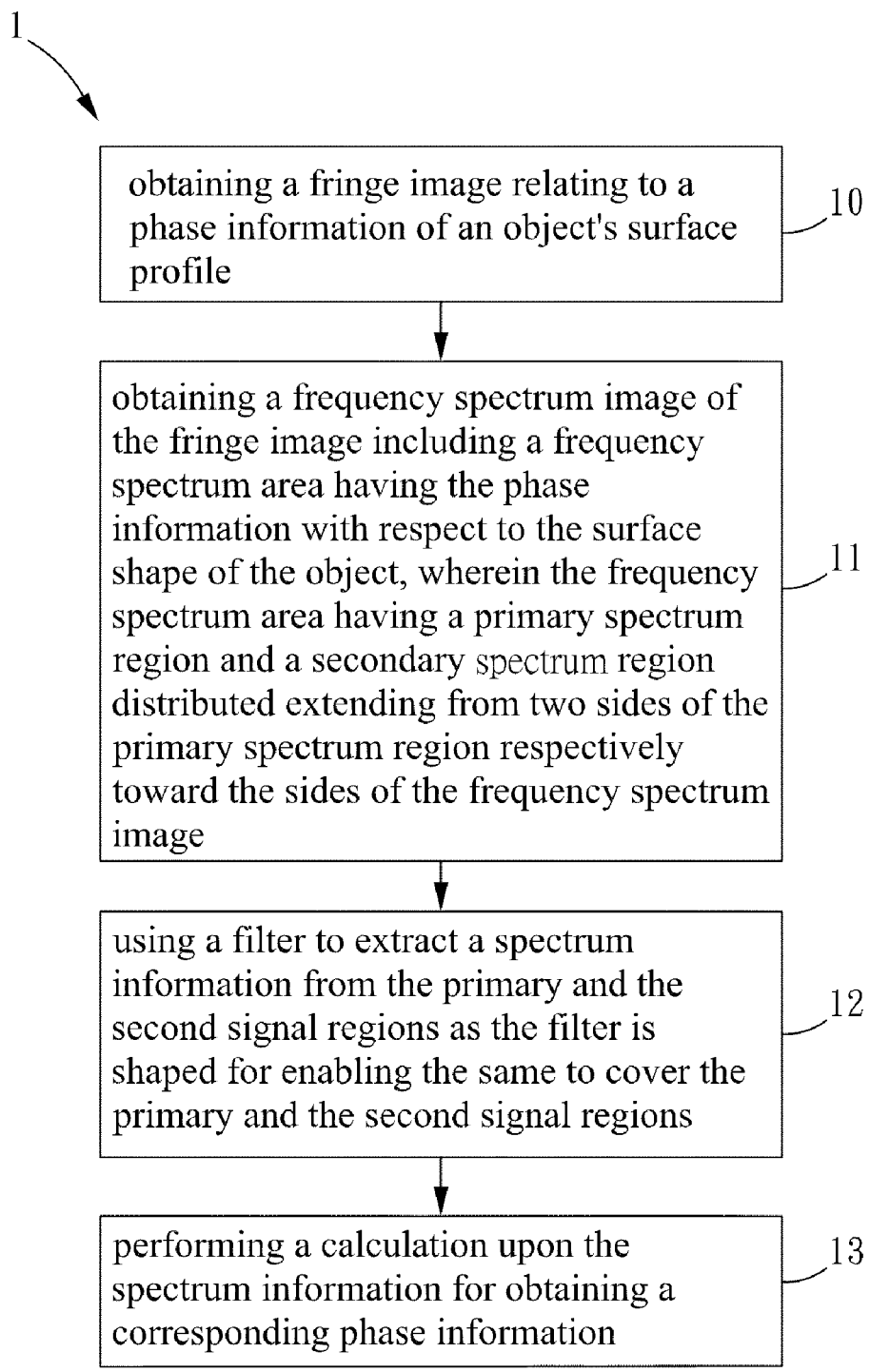
FIG. 2 illustrates a flow chart depicting an embodiment of a method for acquiring the phase information of the present invention.
Figure 3A:
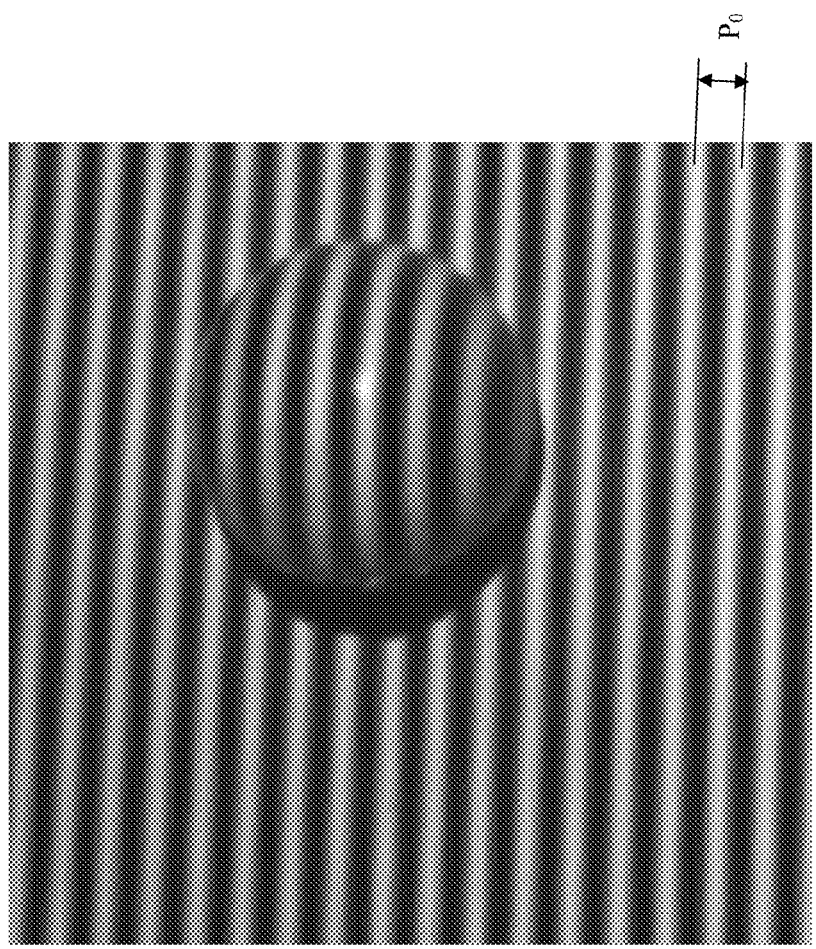
FIG. 3A and FIG. 3B illustrates fringe images respectively with respect to different types of structured light projecting onto the object.
Figure 3B:
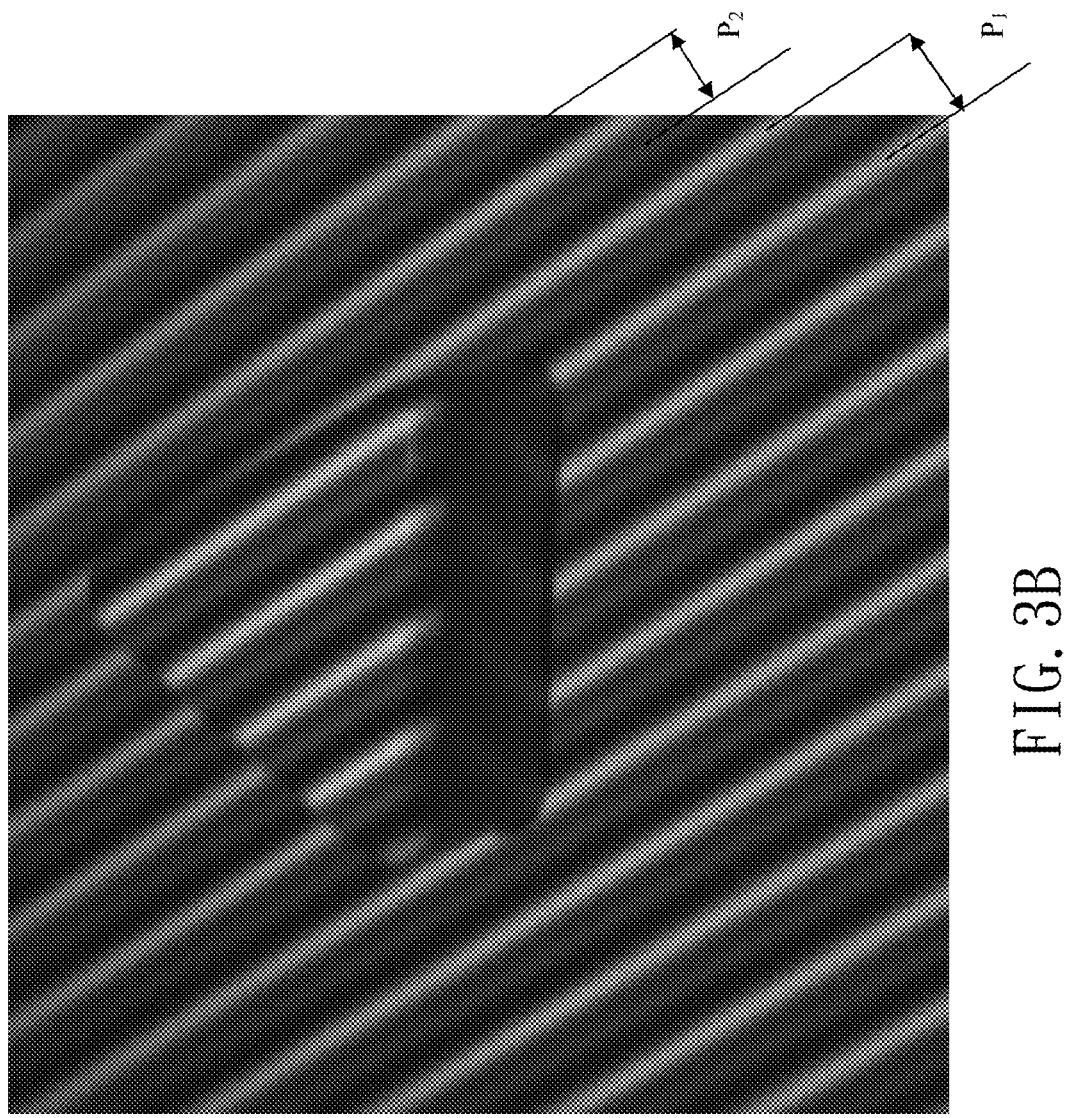

Please refer to FIG. 2, which illustrates a flow chart depicting an embodiment of a method for acquiring the phase information of the present invention. In the present embodiment, the method 1 starts from step 10 for obtaining a fringe image related to a phase information with respect to surface shape information of an object, wherein the fringe image can be a periodic deformed fringe image or a non-periodic deformed fringe image whereas in this embodiment, the fringe pattern is a non-periodic deformed fringe image. In the present embodiment, the fringe image in step 10 refers to a non-periodic deformed fringe image. Meanwhile, in step 10, the fringe image may be obtained by a single-frequency scanning or a dual-frequency scanning method. The single-frequency scanning method is used for acquiring a deformed fringe image, shown in FIG. 3A, with respect to an object having a single periodic fringe pattern projected thereon by means of an image acquiring apparatus. In FIG. 3A, the structured light projected onto the object has a single fringe period $P_0$. On the other hand, the dual-frequency scanning is used for acquiring a deformed fringe image, illustrated in FIG. 3B, with respect to an object having a dual periodic fringe pattern projected thereon, in which the image in FIG. 3B has two kinds of fringe period notated as $P_1$, and $P_2$. In addition to acquiring deformed image by projecting the structured light pattern on the object, in step 10, it is capable of utilizing conventional interferometers, such as the Michelson interferometer or Mirau interferometer, to obtain the deformed fringe image by interfering the reference beam with the object beam having the phase information with respect to surface shape information of the object.

Back to FIG. 2, thereafter, a frequency spectrum image with respect to the fringe image is obtained by performing step 11. In step 11, a Fourier transform is adapted to convert the fringe image from time domain to frequency domain. Taking deformed fringe image, shown in FIG. 3A, associated with the single periodic structured light as an example, the image with respect to the frequency domain is illustrated as FIG. 4A to FIG. 4D, in which FIGS. 4A and 4B refers to frequency spectrum images transformed from the deformed fringe image of FIG. 3A; FIG. 4C illustrates a three-dimensional diagram with respect to the frequency spectrum; and FIG. 4D illustrates a two dimensional frequency spectrum with respect to a cross-section area having extreme value on XZ projection plane of the three-dimensional diagram corresponding to the frequency spectrum shown in FIG. 4C. In FIG. 4D, the extreme value location 901, 911, and 921 are corresponding to the bright regions 90, 91 and 92 respectively in FIG. 4B. Taking FIG. 4A as an example, the bright region 90 having higher gray value represents the zero order frequency spectrum area while the other two bright regions 91, and 92 located respectively at the opposite sides of the bright region 90 are the representatives of the first order spectrum, and so forth. It is noted that the regions containing phase information with respect to the surface shape of the object are located at the region with respect to the +1 order and −1 order frequency spectrum area, which refers to the bright regions 91 and 92 respectively in the present embodiment. For instance, the +1 order frequency spectrum area associated with the bright region 91 includes a primary spectrum region 910 and a secondary spectrum region 911 and 912 distributed extending from two sides of the primary spectrum region 910 along (fx) direction respectively toward the sides of the frequency spectrum image.

Back to FIG. 2 again, afterward, a filter, shaped to cover the primary and the secondary spectrum regions, is adapted to extract a spectrum information from the primary and the secondary spectrum regions by means of performing step 12. Conventionally, taking the deformed fringe pattern with single periodic fringe pattern as an example, the image is represented by the following formula (1):

$$i(x, y) = a(x, y) + b(x, y)\cos[\phi(x, y)] + n(x, y) \qquad (1)$$

where (x, y) represents image coordinate as x and y are respectively the column and row in the image;
i(x, y) is the light intensity;
a(x, y) is the average light intensity of the image's background;
b(x, y) is the modulation amplitude with respect to the structured light;

φ(x, y) is the phase information; and n(x, y) is the noise intensity.

Thereafter, the φ(x, y) is divided into a carrier phase $\phi_c(x, y)$ and an initial phase $\phi_0(x, y)$, which is shown in formula (2) as the following. The carrier phase $\phi_c(x, y)$ can be represented as formula (3) wherein the $f_{c,x}$ represents the vertical spatial frequency while $f_{c,y}$ represents the horizontal spatial frequency.

$$\phi(x, y) = \phi_c(x, y) + \phi_0(x, y) \quad (2)$$

$$\phi_c(x, y) = 2\pi(f_{c,x}x + f_{c,y}y) \quad (3)$$

By substituting the aforesaid formulas (2) and (3) into the formula (1), the formula (1) can be represented as formula (4). Since $\cos[\alpha+\beta] = \cos\alpha\cos\beta - \sin\alpha\sin\beta$, the formula (4) can also be represented as formula (5).

$$i(x, y) = a(x, y) + b(x, y)\cos[\phi_c(x, y) + \phi_0(x, y)] + n(x, y) \quad (4)$$

$$i(x, y) = a(x, y) + b(x, y)\cos\phi_c(x, y)\cos\phi_0(x, y) - b(x, y)\sin\phi_c(x, y)\sin\phi_0(x, y) + n(x, y) \quad (5)$$

Moreover, the aforesaid formula (5) can be factorized into the following formula (6):

$$i(x, y) = a(x, y) + \quad (6)$$
$$\frac{1}{2}b(x, y)[\cos\phi_c(x, y) + j\sin\phi_c(x, y)][\cos\phi_0(x, y) + j\sin\phi_0(x, y)] +$$
$$\frac{1}{2}b(x, y)[\cos\phi_c(x, y) - j\sin\phi_c(x, y)][\cos\phi_0(x, y) - j\sin\phi_0(x, y)] +$$
$$n(x, y)$$

Assuming $$c(x, y) = \frac{1}{2}b(x, y)\exp[j\phi_0(x, y)],$$

formula (6) can be further transformed and represented as formula (7).

$$i(x, y) = a(x, y) + c(x, y)\exp[j\phi_c(x, y)] + c^*(x, y)\exp[-j\phi_c(x, y)] + n(x, y) \quad (7)$$

Since the Fourier transformation is defined as formula (8), formula (8) is converted into formula (9) by Fourier transform.

$$C(f_x - f_{c,x}, f_y - f_{c,y}) = \int_{-\infty}^{\infty}\int_{-\infty}^{\infty} c(x, y)\exp[j2\pi(f_{c,x}x + f_{c,y}y)]\,dx\,dy \quad (8)$$

$$I(f_x, f_y) = \quad (9)$$
$$A(f_x, f_y) + C(f_x - f_{c,x}, f_y - f_{c,y}) + C^*(f_x + f_{c,x}, f_y + f_{c,y}) + N(f_x, f_y)$$

Similarly, the deformed fringe image formed by dual-frequency scanning can also be derived and represented as formula (10), wherein $C_{eq}$ and $C_{eq}^*$ are spectrum information of equivalent period fringe.

$$I(f_x, f_y) = A(f_x, f_y) + C_1(f_{1x} - f_{1x}, f_y - f_{1y}) C_1^*(f_x + f_{1x}, f_y + f_{1y})$$
$$C_2(f_x - f_{2x}, f_y - f_{2y}) + C_2^*(f_x + f_{2x}, f_y + f_{2y}) C_{eq}(f_x - f_{3x}, f_y - f_{3y}) + C_{eq}^*(f_x + f_{3x}, f_y + f_{3y}) \quad (10)$$

From the foregoing transformation, the spectrum information represented as $C_{i=1,2}(f_x - f_{c,x}, f_y - f_{c,y})$ or $C^*_{i=1,2}(f_x - f_{c,x}, f_y - f_{c,y})$ in formula (10) is corresponding to the phase information which relates to the structured light on the object deformed with respect to the surface shape of the object wherein the phase information is a key point relating to whether the process for reconstructing the surface shape of the object is correct or not. It is noted that the spectrum information with respect to phase information can be extracted from the area of the first order spectrum areas or other higher order spectrum areas, such as the spectrum areas 91, 92 shown in FIG. 4A and FIG. 4D.

Figure 4A:
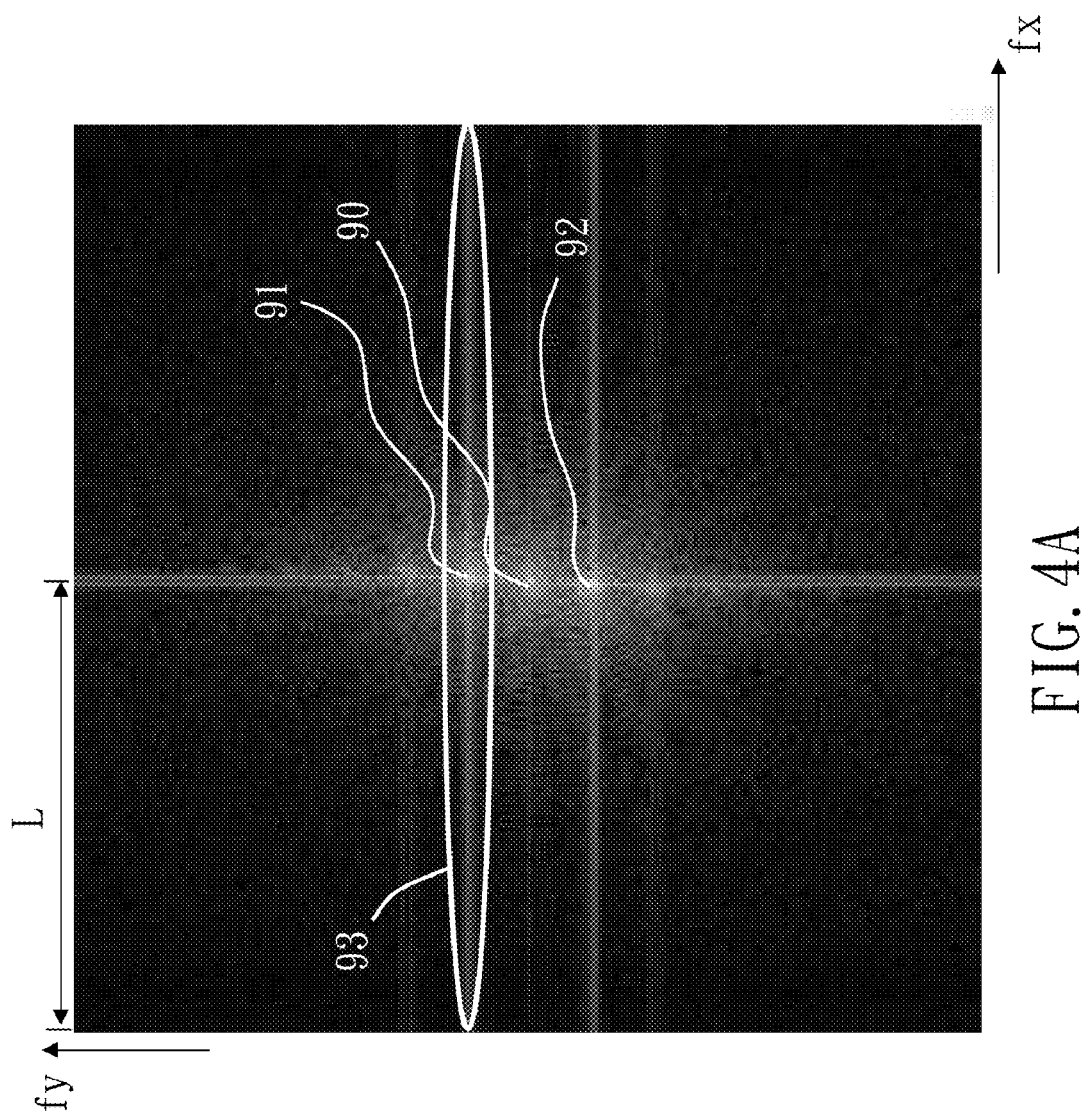
FIGS. 4A and 4B illustrates frequency spectrum images transformed from the fringe images having deformed pattern.
Figure 4B:
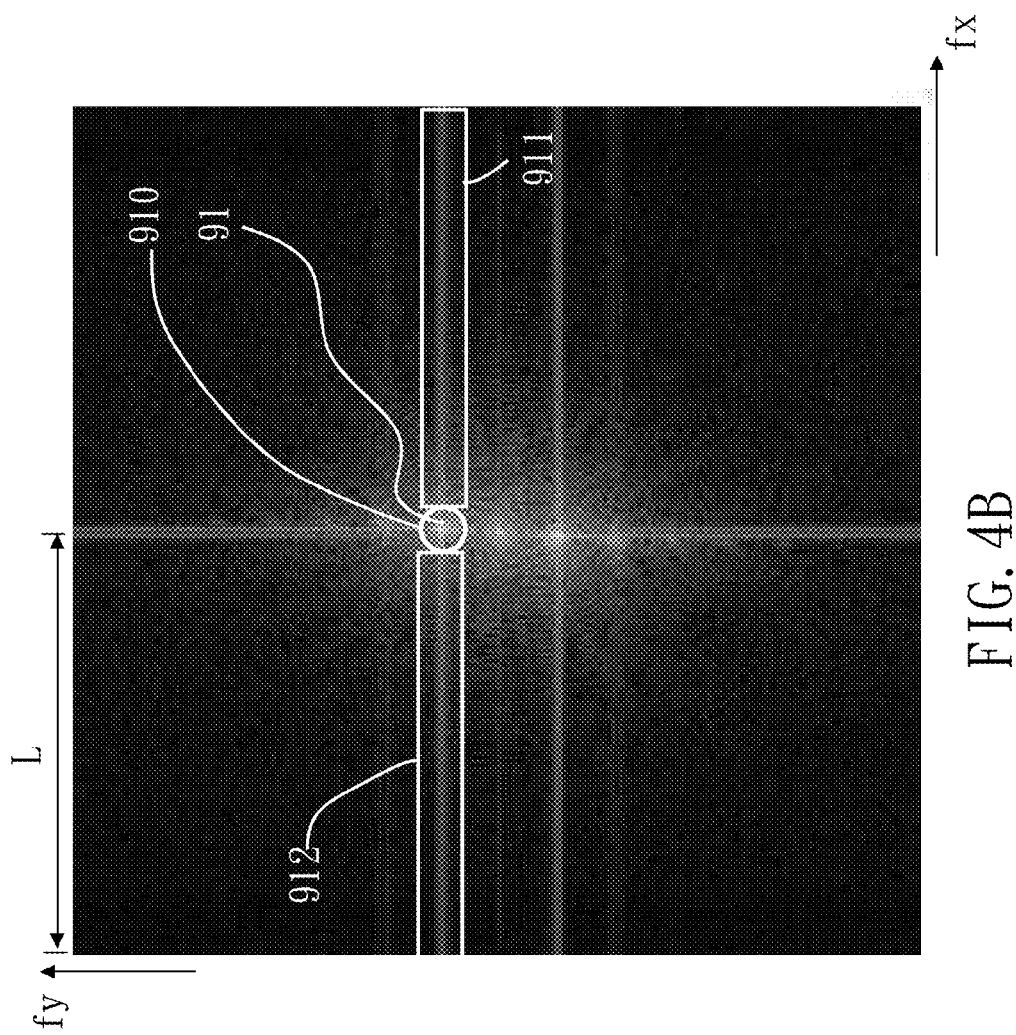
Figure 4C:
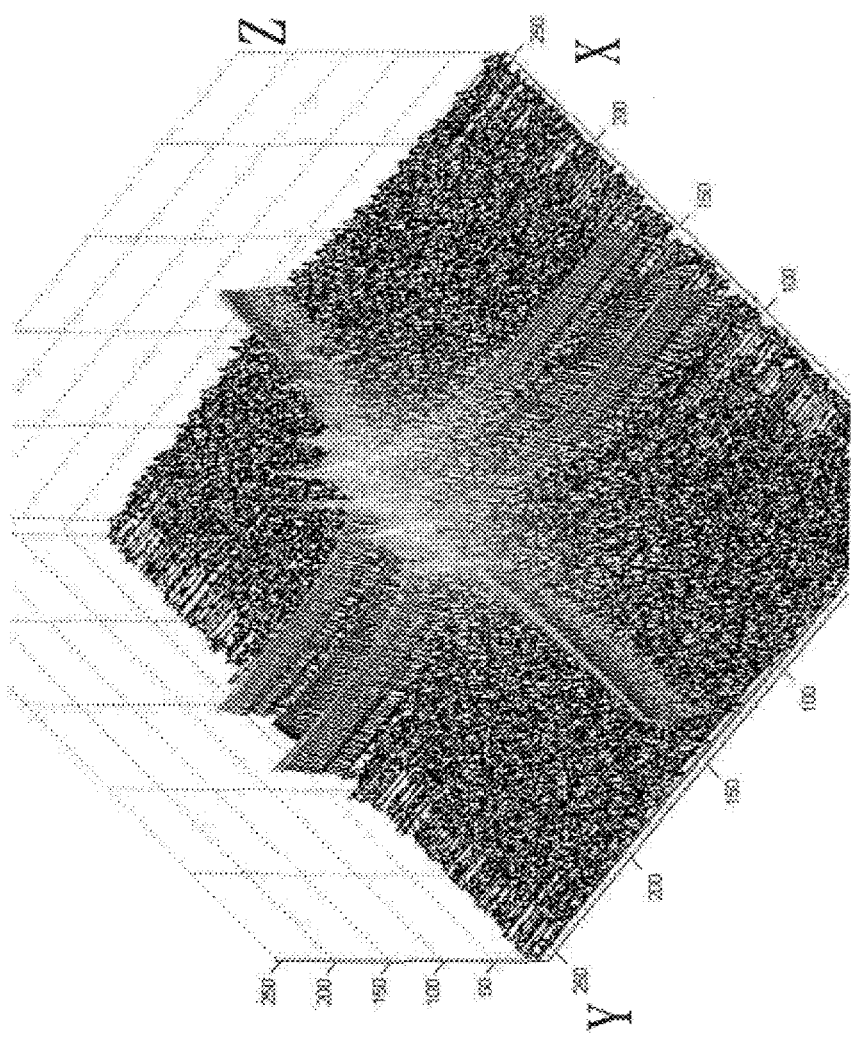
FIG. 4C illustrates a three-dimensional diagram with respect to the frequency spectrum.
Figure 4D:
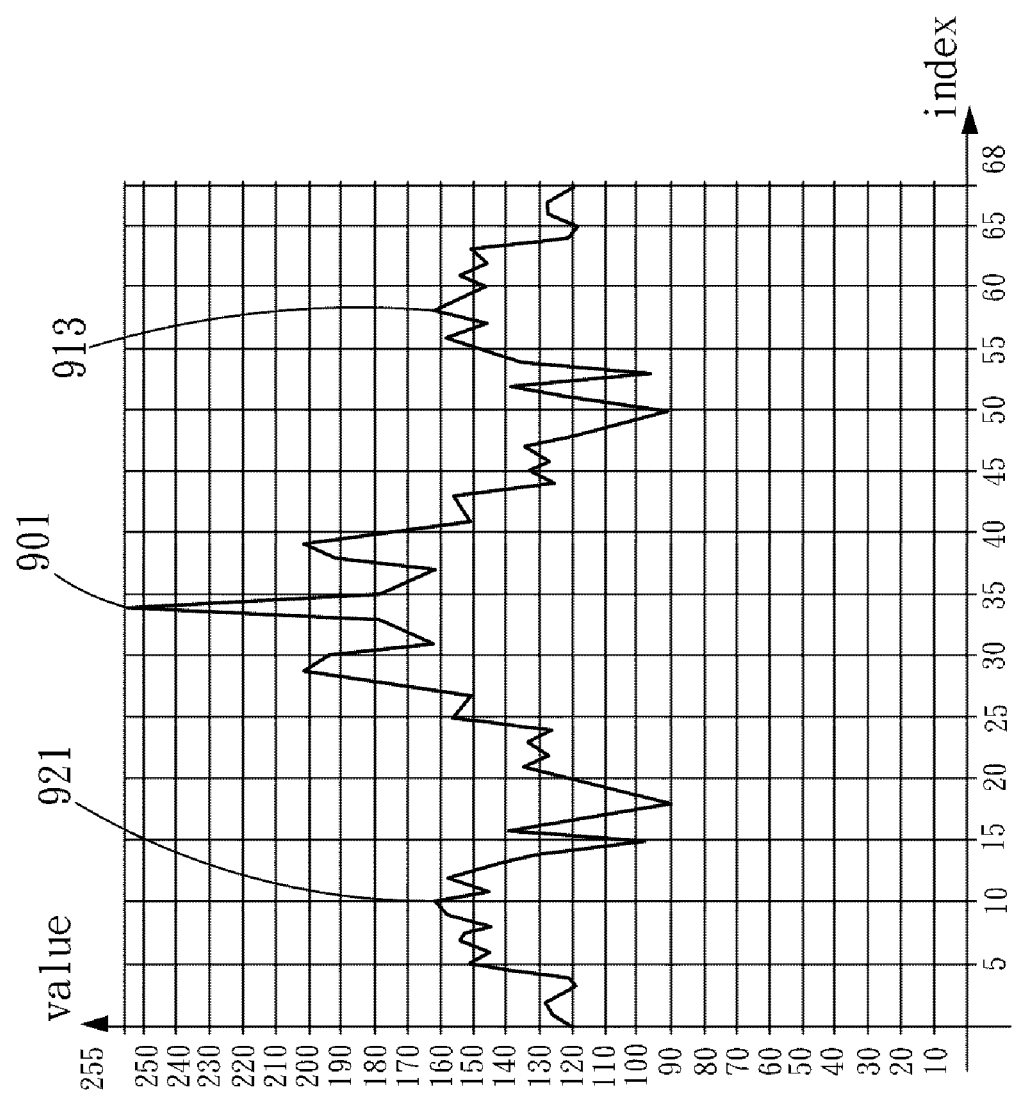
FIG. 4D illustrates a two-dimensional frequency spectrum with respect to an area having extreme value on XZ projection plane of the three-dimensional diagram corresponding to the frequency spectrum shown in FIG. 4C.
Figure 4E:
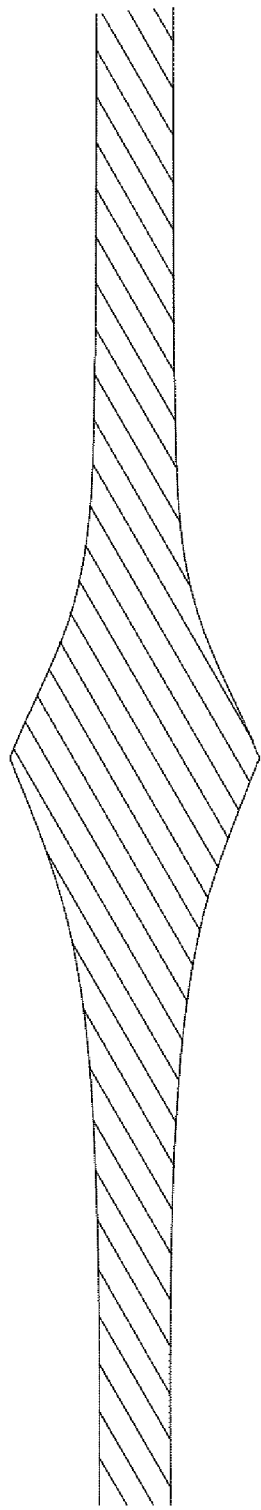
FIG. 4E illustrates contour with respect to a first order frequency spectrum area.

For extracting the spectrum information with respect to the phase information from the first order spectrum within the frequency spectrum image, shown in FIG. 4A, conventionally, it is usually to adapt the 2-D Hanning filter or the circular band-pass filter for extracting the spectrum information from its primary spectrum region. Afterward, a calculation can be performed to obtain the phase information for reconstructing the surface shape of the object. In step 12 of the present invention, however, the circular band-pass filter is not adapted to extract the phase information but a band-pass filter covering the primary spectrum region and secondary spectrum within the first order spectrum area is adapted for extracting the spectrum information. As illustrated in FIG. 4A, the area 93 is substantially an area containing the first order spectrum, and the enlargement of which is shown in FIG. 4E. The oblique-line area is a frequency spectrum area having the phase information. In the present invention, band-pass filters having various kinds of shape are adapted to fit the contour of the frequency spectrum area for extracting the phase information.

Figure 5B:
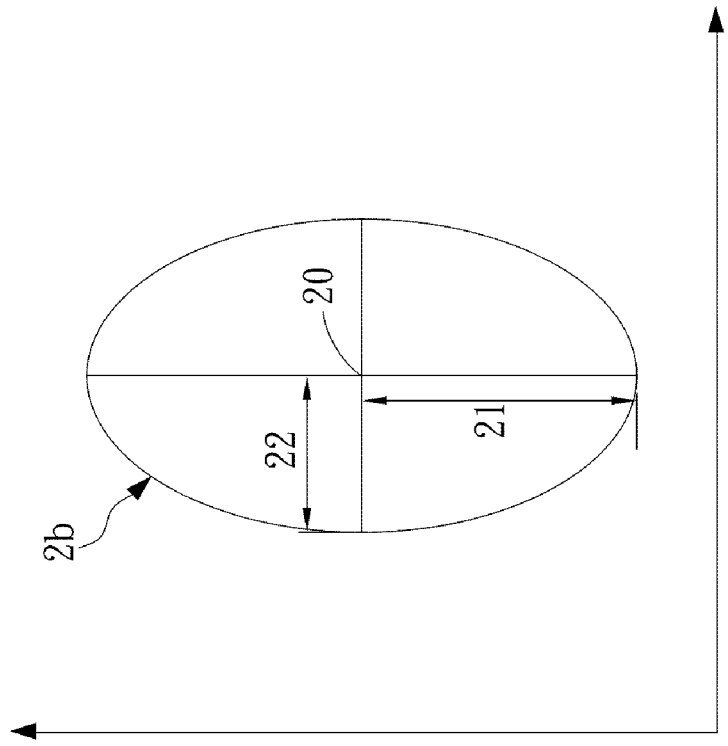
FIG. 5A and FIG. 5B are schematic diagrams showing oval-shaped band-pass filters used in the present invention respectively.
Figure 5A:
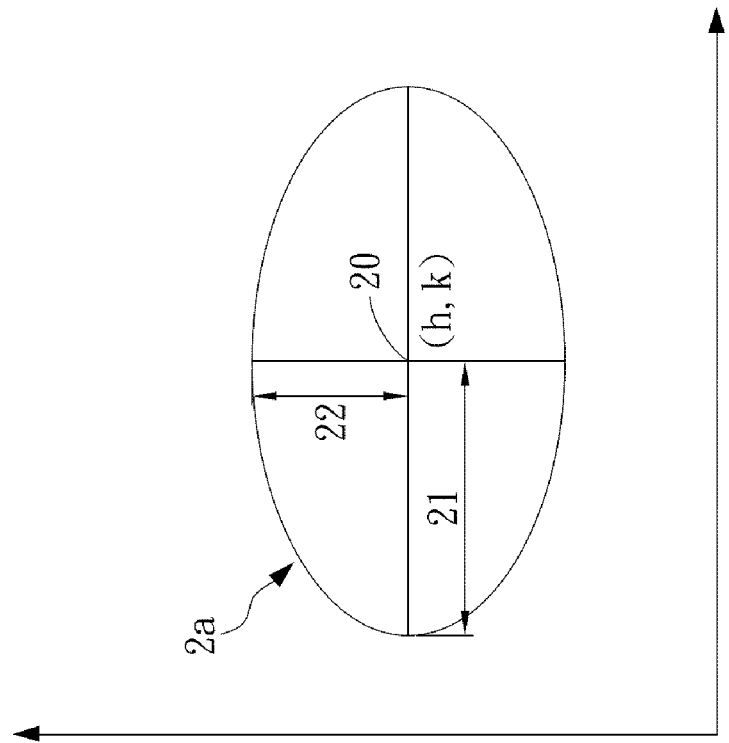

In the embodiment of the present invention, an oval-shaped filter, as the filters 2a and 2b shown in FIG. 5A and FIG. 5B, is specifically deigned to match with the actual three-dimensional frequency spectrum distribution, which is represented as formula (11).

$$\begin{cases} \frac{(x-h)^2}{a^2} + \frac{(y-k)^2}{b^2} = 1 & \text{for } -a \le x \le a, -b \le y \le b \\ \frac{(x-h)^2}{b^2} + \frac{(y-k)^2}{a^2} = 1 & \text{for } -a \le y \le a, -b \le x \le b \end{cases} \quad (11)$$

wherein, (h,k) is the symmetrical center as the location 20 indicated in FIG. 5A and FIG. 5B;

a is the length of the long axis 21 of the oval-shaped filter; and b is the length of the short axis 22 of the oval-shaped filter.

It is noted that the center 20 in the oval-shaped filter 2 is corresponding to the local maximum in the area 91 or area 92 of FIG. 4A, i.e. the center 20 is located at a position having the largest gray value in the area 91 or area 92.

Figure 6A:
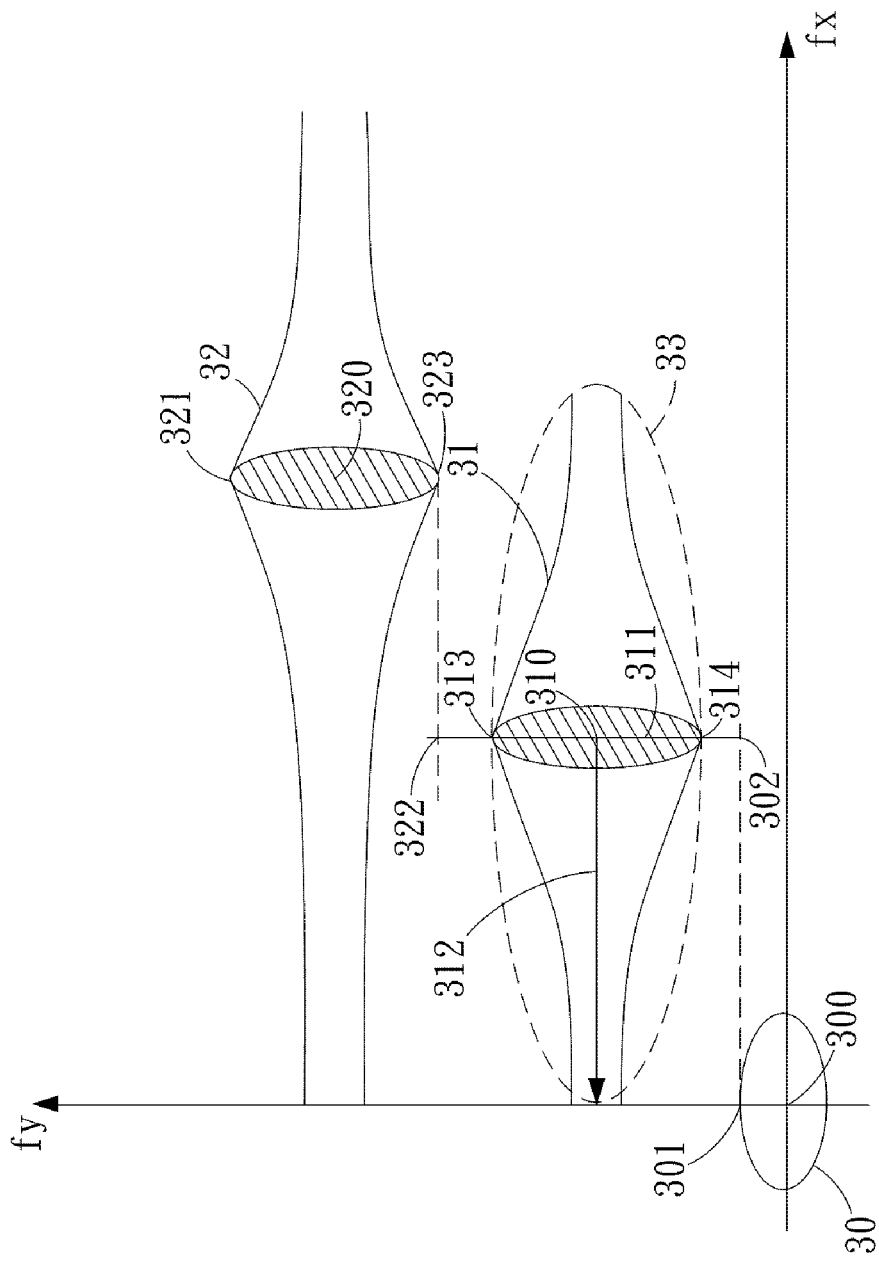
FIG. 6A and FIG. 6B are schematic diagrams showing the process for extracting spectrum information by use of the oval-shaped band-pass filter.

The aforesaid oval-shape filter adapted to extract the complete spectrum information from the fringe image can be implemented in two different ways. One of which is applied when the projection angle is smaller than 45 degrees or ranges from 135 degrees and 180 degrees. Please refer to FIG. 6A, which is a schematic diagram showing the use of an oval-shaped band-pass filter for extracting spectrum information from a frequency spectrum image formed by projecting structured light in a projection angle smaller than 45 degrees or ranging from 135 degrees and 180 degrees. As the projected structured light being projected on the object is inclined, the line connecting the centers of frequency spectrum areas with a different order is also inclined as shown in FIG. 6A. In FIG. 6A, the area 30 represents the zero order frequency spectrum area, in which the location 300 is the position having local maximum while the location 301 is the top of the area 30.

Moreover, the area 31 represents the first order frequency spectrum area containing phase information with respect to the surface shape of the object, in which the location 310 is the position having local maximum while the location 313 and 314 are respectively the top and the bottom of the area 31. In addition, the area 32 is the second order frequency spectrum area, in which the location 320 is the position having local maximum while the location 321 and 323 are respectively the top and the bottom of the area 32.

At first, the centers of the frequency spectrum area 30, 31, and 32, shown in FIG. 6A, are calculated respectively according to the known period of structured light. Next, the location of the oval-shaped band-pass filter 33 is determined wherein the center of the oval-shaped band-pass filter is corresponding to the center 310 of the first order frequency spectrum area while the long axis 312 of the oval-shaped band-pass filter 33 is precisely to be half of the image length of the frequency spectrum image along a first direction (fx) as well as the short axis 311 of the oval-shaped filter is no larger than a minimum vertical distance in a second direction (fy) defined between the local maximum 310 of the frequency spectrum area 31 and a point 322 or 302 located on the extension along the first direction (fx) from the point of the adjacent frequency spectrum area 30, or 32 nearest to the frequency spectrum area 31. The way to determine the vertical distance starts by searching the top point 301 of the frequency spectrum area 30 and the bottom point 323 of the frequency spectrum area 32 and then extending along the first direction (fx) from the top point 301 and the bottom point 323. Afterward, the vertical distance can be defined from the center of the frequency spectrum area 31 to the extension line.

According to the foregoing principle, the equation with respect to the oval-shaped filter and condition associated therewith are shown in formula (12), wherein, (h,k) is the location 310 of the local maximum of the first order spectrum area; $f_a$ is the length of the long axis, as the distance 312 in FIG. 6A; and $f_b$ is the length of the short axis, as the distance 311 in FIG. 6A.

$$\frac{(x-h)^2}{f_a^2} + \frac{(y-k)^2}{f_b^2} = 1 \text{ for} \quad (12)$$

$$f_a < \overline{(310)(302)} \text{ and } f_a < \overline{(310)(322)}$$

wherein, (h,k) is the location of the local extreme of the first order spectrum area 310;

$f_a$ is the length of the long axis, as the distance 312 in FIG. 6A;

$f_b$ is the length of the short axis, as the distance 311 in FIG. 6A.*a*

Figure 6B:
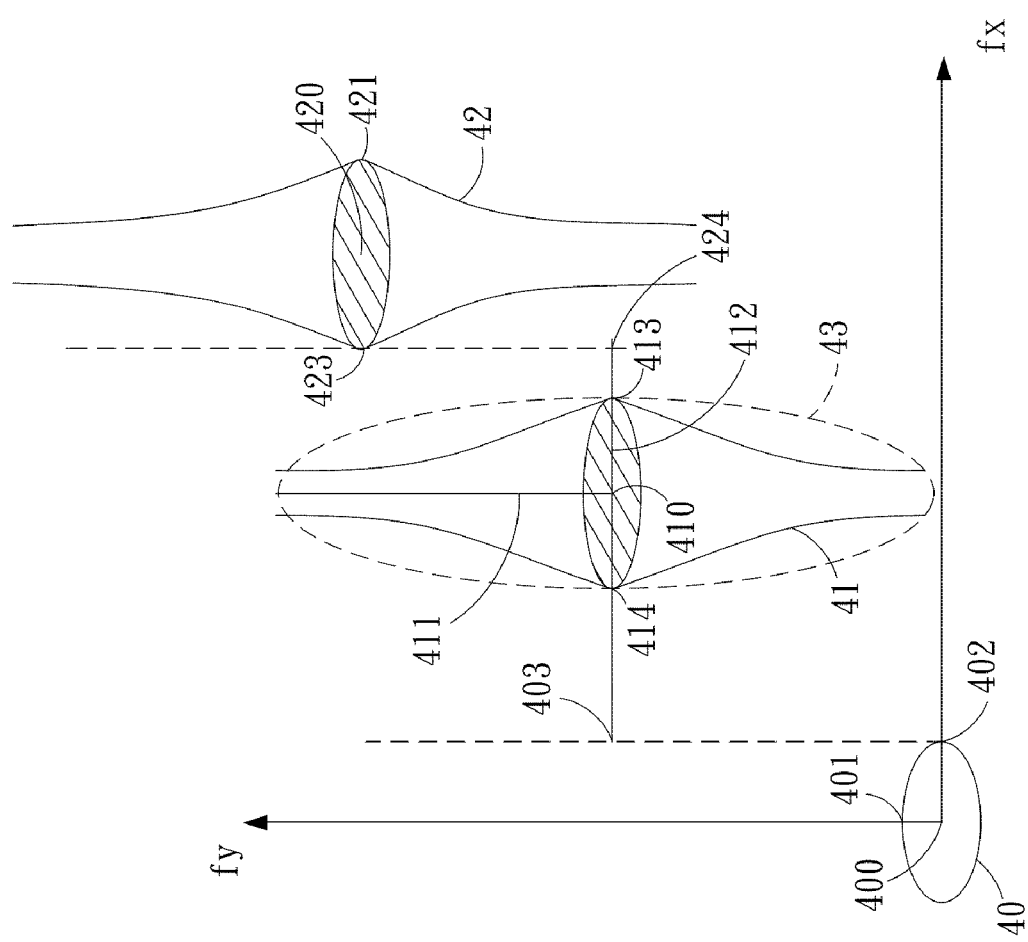

In addition, the second way for implementing the oval-shaped band pass filter is applied when the projection angle ranges from 45 degrees and 135 degrees, which is illustrated in FIG. 6B, wherein the area 40 represents the zero order frequency spectrum area, in which the location 400 is the position having local maximum while the location 401 is the top of the area 40. Moreover, the area 41 represents the first order frequency spectrum area containing phase information with respect to the surface shape of the object, in which the location 410 is the position having local maximum while the location 413 and 414 are respectively the left and right extreme values of the area 41. In addition, the area 42 is the second order frequency spectrum area, in which the location 420 is the position having local maximum while the location 421 and 423 are respectively the left and right extreme values of the area 42.

At first, the centers of the frequency spectrum area 40, 41, and 42, shown in FIG. 6B, are calculated respectively according to the known period of the projected structured light. Next, the location of the oval-shaped band-pass filter 43 is determined wherein the center of the oval-shaped band-pass filter is corresponding to the center 410 of the first order frequency spectrum area while the long axis 411 of the oval-shaped band-pass filter 43 is precisely to be half of the image length of the frequency spectrum image along a second direction (fy) as well as the short axis 412 of the oval-shaped filter is no larger than a minimum horizontal distance in a first direction (fx) defined between the local maximum 410 of the frequency spectrum area 41 and a point 403 or 424 located on the extension along the second direction (fy) from the point of the adjacent frequency spectrum area 40, or 42 nearest to the frequency spectrum area 31. The way to determine the horizontal distance starts by searching the right extreme point 402 of the frequency spectrum area 40 and the left extreme point 423 of the frequency spectrum area 42 and then extending along the second direction (fy) from the left extreme point 423 and the right extreme point 402. Afterward, the horizontal distance can be defined from the center of the frequency spectrum area 41 to the extension line.

According to the foregoing principle, the equation with respect to the oval-shaped filter and condition associated therewith are shown in formula (13), wherein, (h,k) is the location 410 of the local maximum of the first order spectrum area; $f_a$ is the length of the long axis, as the distance 412 in FIG. 6B; and $f_b$ is the length of the short axis, as the distance 411 in FIG. 6B.

$$\frac{(x-h)^2}{f_b^2} + \frac{(y-k)^2}{f_a^2} = 1 \text{ for} \quad (13)$$

$$f_a < \overline{(410)(402)} \text{ and } f_a < \overline{(410)(422)}$$

wherein, (h,k) is the location of the local extreme of the first order spectrum area 410;

$f_a$ is the length of the long axis, as the distance 411 in FIG. 6B;

$f_b$ is the length of the short axis, as the distance 412 in FIG. 6B.

After the filtering process by means of the foregoing oval-shaped band-pass filter, it is capable of obtaining the spectrum information with respect to the first order spectrum area, which is substantially the C(x,y) represented in formula (9). Back to FIG. 2, after extracting the spectrum information corresponding to phase information with respect to the surface shape of the object from the frequency spectrum image, step 13 is performed for calculating the spectrum information so as to obtain the phase information. In step 13, an inverse Fourier transform is performed to convert the spectrum information C(x,y) into c(x,y). Thereafter, the $$c(x, y) = \frac{1}{2}b(x, y)\exp[j\phi(x, y)]$$

is expressed in the form shown in formula (14).

$$c(x, y) = \frac{1}{2}b(x, y)\exp[j\phi(x, y)] \quad (14)$$
$$= b(x, y)\exp[\cos(\phi) + j\sin(\phi)]$$

Afterward, the phase information with respect to the object surface profile information can be expressed as formula (15) according the formula (14).

$$\phi = \tan^{-1}\left[\frac{\text{Im}[c1]}{\text{Re}[c1]}\right] \quad (15)$$

In regard to the extracting of phase information with respect to the structured light having dual frequency, it is capable of utilizing the oval-shaped filter to extract the spectrum information $c_n(x, y)$, (n=1,2) with respect to the fringe image formed by projecting structured light having dual-frequency fringe and to obtain an equivalent period $C_{eq}(x, y)$. Thus, by performing the inverse Fourier transform, the phase information with respect to the two individual frequency structured light and the equivalent period with respect to the dual-frequency structured light can be converted into the formula (16) and (17), respectively.

$$\phi_1 = \tan^{-1}\left[\frac{\text{Im}[c1]}{\text{Re}[c1]}\right] \quad (16)$$
$$\phi_2 = \tan^{-1}\left[\frac{\text{Im}[c2]}{\text{Re}[c2]}\right]$$
$$\phi_{eq} = \tan^{-1}\left[\frac{\text{Im}[c_{eq}]}{\text{Re}[c_{eq}]}\right] \quad (17)$$

As soon as the phase information is obtained, it is capable of performing the phase reconstruction by performing an inverse Fourier transformation on the phase information for obtaining the wrapped phase diagram. However, since the tangent function, i.e. $\tan^{-1}$, is a discontinuous function so that the result of phase restoring is also discontinuous. Thus, for reconnecting the phase discontinuities after the inverse Fourier transformation, Euler transformation and phase unwrapping are adapted to obtain continuous phase so as to reconstruct the surface shape of the object. It is noted that the Fourier transformation, the Euler transformation and the relating image reconstruction techniques are all known to those skilled in the art and thus are not described further herein.

Figure 7A:
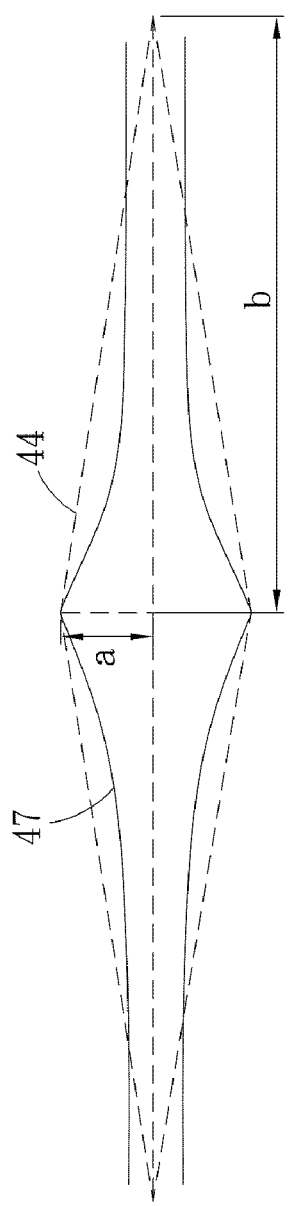
FIG. 7A and FIG. 7C illustrates different embodiments of the band-pass filter of the present invention respectively.
Figure 7B:
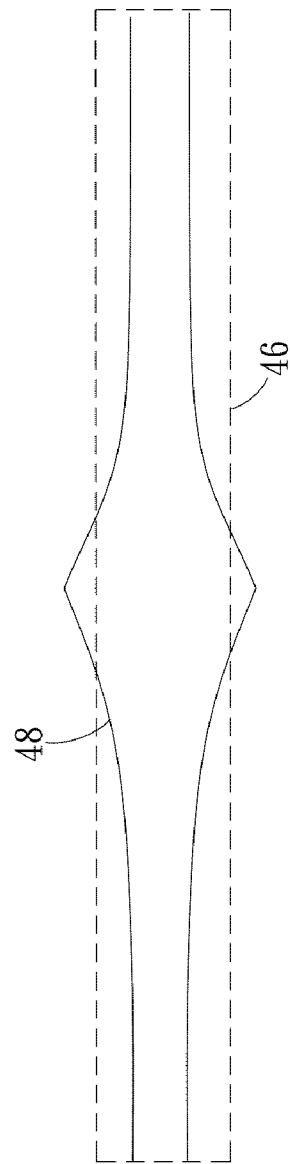
Figure 7C:
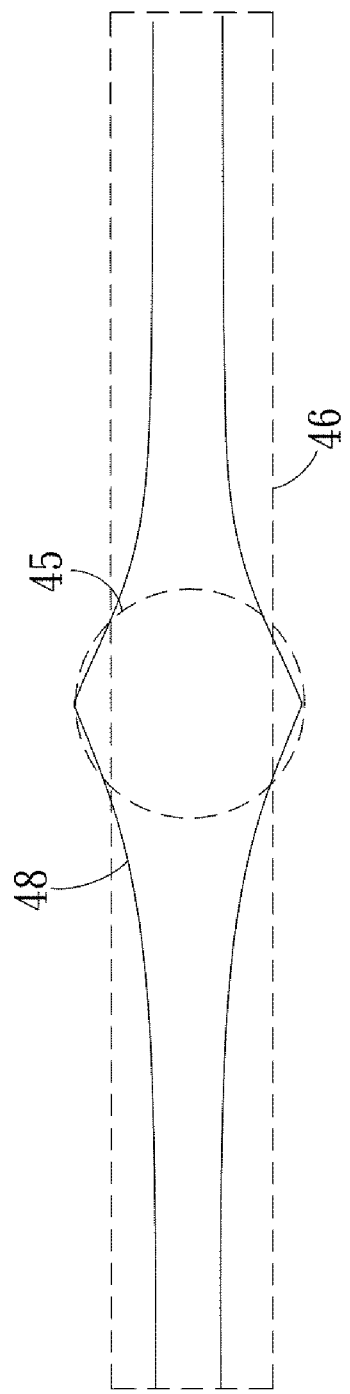

Although the band-pass filter used in the aforesaid embodiment of the invention is an oval-shaped filter, it is not limited thereby but can be a filter whose shape is capable of covering the contour of the first order spectrum area. Please refer to FIG. 7A to FIG. 7C, which are schematic diagrams showing various band-pass filters of different shapes capable being adapted for covering the primary and the second signal regions of the +1 order or −1 order frequency spectrum areas. In FIG. 7A, the band-pass filter is a diamond-shaped filter 44 whose center is corresponding to the center of the first order spectrum area 47. The diamond-shaped band-pass filter has a long axis a and a short axis b. In FIG. 7B, the band-pass filter is a rectangle-shaped filter 46 capable of covering the primary and the secondary spectrum regions of the first order frequency spectrum area 48. In FIG. 7C, the band-pass filter is a filter formed by combining a circular filter 45 and a rectangle-shaped filter 46 together for enabling the outline of the filter to fit with the contour of the frequency spectrum area 48. According to the principle illustrated in FIG. 7C, the band-pass filter adapted in the present invention can be a filter by combining a plurality of filters having different shapes respectively, such as a circular shape combined with an oval shape or a circular shape combined with a diamond shape.

In the foregoing description, it only discloses the process for positioning of the oval-shape band-pass filter and determining the long/short axes of the oval-shaped band-pass filter but it doesn't disclose the process for optimizing the covered spectrum range of the band-pass filter. Please refer to FIG. 8, which is a flow chart depicting the steps required for optimizing the oval band-pass filter of the invention. The optimizing method 5 starts from step 50. At step 50, a deformed fringe image of a reference sphere is obtained. It is noted that step 50 is similar to step 20 of FIG. 2, but is different in that the object being measured in FIG. 2 is replaced by a reference sphere with its known reference characteristics, such as degree of sphericity, radius, and so on. Afterward, step 51 is performed to transform the fringe image into a frequency spectrum image by using Fourier transformation; and then the flow chart proceeds to step 52.

At step 52, an oval-shaped reference filter capable of covering specific spectrum ranges is adapted to extract a spectrum information from a frequency spectrum area having a phase information within the frequency spectrum image with respect to the reference sphere, wherein the frequency spectrum area has a primary spectrum region and a secondary spectrum region distributed extending from two sides of the primary spectrum region respectively toward the sides of the frequency spectrum image. It is noted that the specific spectrum range covered by the oval-shaped filter is determined by adjusting the length of its short axis while the length of its long axis is determined according to the size of the frequency spectrum image, which is usually fixed because the size of frequency spectrum image is a fixed size generally.

Thereafter, step 53 is processed to perform a calculation upon the spectrum information obtained in step 52 for obtaining the phase information with respect to the spectrum range covered by the oval-shaped filter and then the flow chart proceeds to step 54. It is noted that the proceeding from step 50 to step 53 is similar to that described in FIG. 2 and thus are not described further herein. At step 54, the phase information is restored by phase unwrapping and the surface shape of the reference sphere can be reconstructed according to the restored phase information so as to obtain the at least one characteristic value of the reference sphere, wherein the characteristic value can be the curvature radius and degree of curvature. In this embodiment, as the reference sphere is a standard sphere, the characteristic value includes the radius of the sphere and the degree of sphericity as well.

Next, step 55 is performed to change the size of the reference filter and repeat the steps 52-55 in a plurality of times for obtaining a plurality of sets of at least one reconstructed characteristic associated with the reference sphere, wherein the plurality sets of at least one reconstructed characteristics are corresponding to the reference filters having different sizes for covering different spectrum range, respectively.

In the current step 55, the covering range of the reference filter is changed under the condition of fixing the length of long axis but adjusting the short axis instead. According to the formula (12) and (13), it is capable of understanding that the short axis can be adjusted within the specific range, so a new size of the reference filter covering a specific spectrum range can be obtained by adjusting the length of short axis in step 55. Thereafter, by means of repeating from step 52 to step 55 by a plurality times, a plurality sets of characteristic including the sphere radius and the degree of sphericity can be obtained. After that, step 56 is performed to compare the difference between the plurality of sets of at least one characteristic and the known reference characteristics associated with the reference sphere. In step 56, since the reference characteristics of sphere radius and the degree of sphericity can be measured by instrument with high accuracy and precision directly, they can be usually employed for the optimization process.

After that, each set of at least one characteristic is compared with the measured reference characteristic with respect to the reference sphere. Then, step 57 is performed to select the reference filter having the smallest difference between the corresponding reconstructed characteristic and the reference characteristic as an optimized band-pass filter. The optimized oval-shaped band-pass filter is capable of being adapted to perform the steps 10~13 in FIG. 2 because the reconstructed characteristics of the object corresponding to the optimized oval-shaped band-pass filter has the smallest error comparing with the reference characteristics measured by more accurate instrument so that the size of the optimized oval-shaped band-pass filter can extract more precise spectrum information for phase unwrapping and further surface shape reconstructing while performing the method 1 in FIG. 2.

Figure 9A:
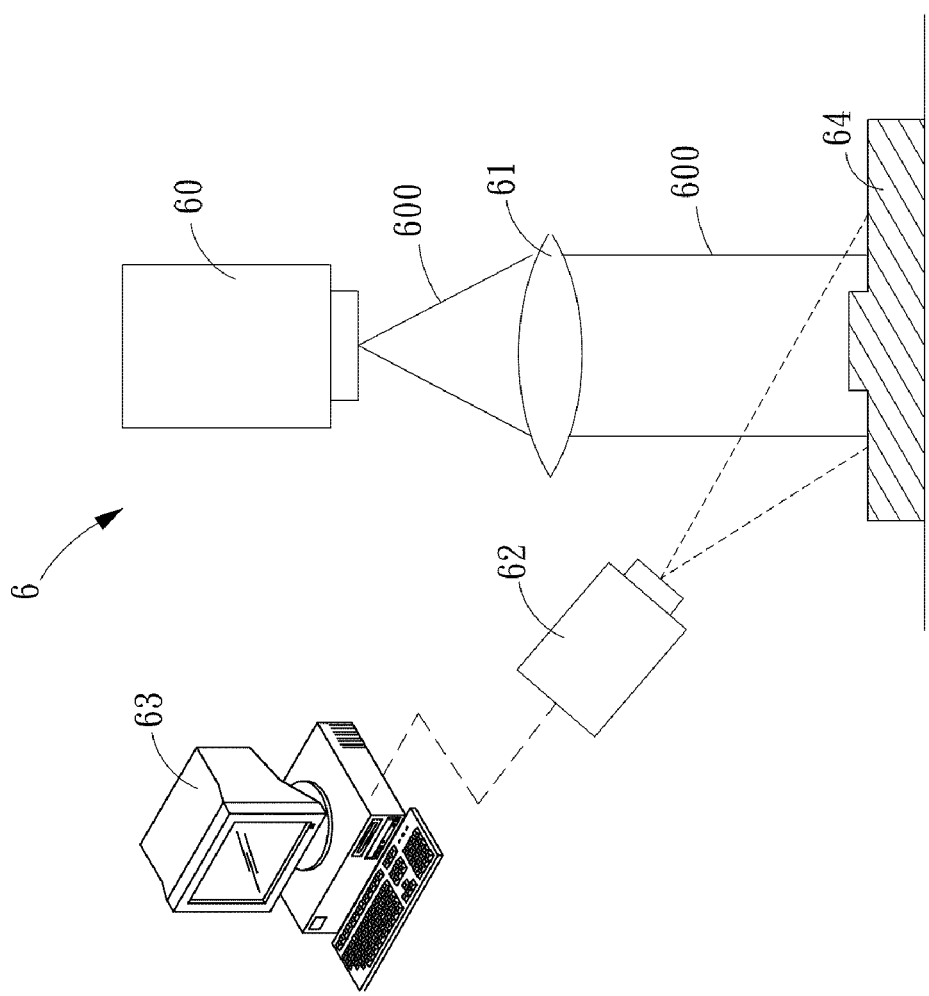
FIG. 9A illustrates an embodiment of a system for measuring three-dimensional surface shape of the present invention.

Please refer to the FIG. 9A, which illustrates an embodiment of a system for measuring three-dimensional surface shape of the present invention. The system 6 comprises a projection unit 60, a collimating lens module 61, an image acquiring device 62 and a control unit 63. The projection unit 60 is designed to project a structured light 600 onto the object 64 wherein the structured light 600 can be a single-frequency or dual-frequency structured light. The projection unit 60 can be a digital light process (DLP) device or a liquid crystal on silicon (LCOS) device. In this embodiment, the projection unit 60 is a DLP device in which the fringe of the structured light is a sinusoidal fringes based on the principle of shadow moire, and output by the control of computer for providing diversity and convenience while measuring surface shape with respect to different kinds of objects so that the phase discontinuity caused by a surface having step heights can be prevented. Moreover, by the use of a digital micromirror device (DMD) in the DLP device for modulating the structured light having single-period or dual-period, the measurement range of the system 6 can be increased.

The collimating lens module 61 is used for guiding the structured light 600 to the object 64. In the present embodiment, the collimating lens module 61 has a plurality of lens which are known to those skilled in the art and thus will not be described further herein. The image acquiring apparatus 62 is arranged for acquiring the deformed fringe image with respect to the object 64. The controller unit 63, electrically coupled with the image acquiring apparatus 62, is capable of performing the flow chart illustrated in FIG. 2 and FIG. 8 for processing the deformed fringe image so as to obtain a frequency spectrum image containing a frequency spectrum area having the phase information with respect to surface shape of the object, wherein the frequency spectrum area is composed of a primary spectrum region and a secondary spectrum region distributed extending from two sides of the primary signal region respectively toward the sides of the frequency spectrum image. Moreover, the control unit 63 extracts a spectrum information by employing a filter shaped covering the primary and the secondary spectrum regions, and then obtains the corresponding phase information by performing a calculation upon the spectrum information.

Figure 8:
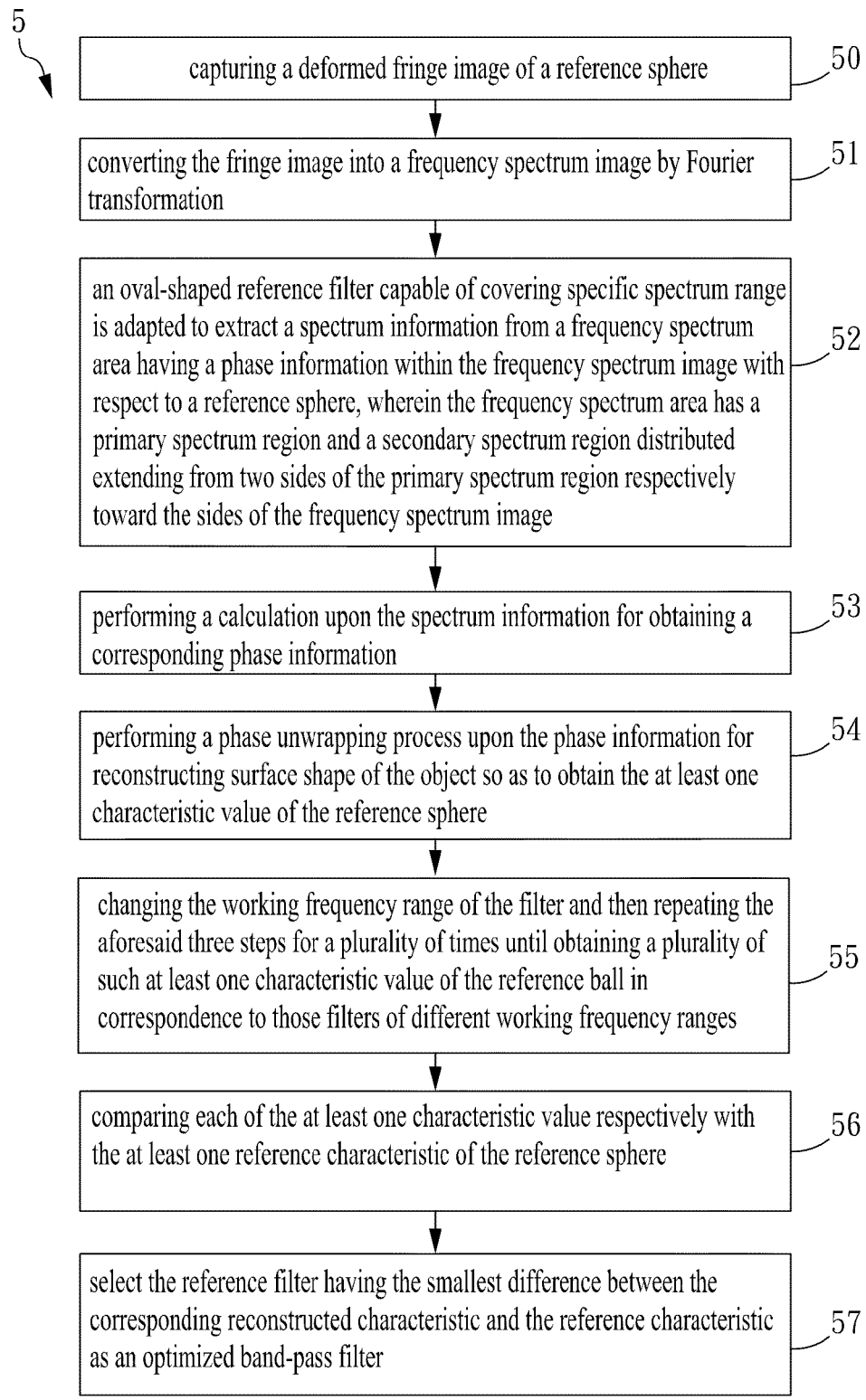
FIG. 8 illustrates an embodiment of flow chart for optimizing the oval-shaped band-pass filter of the present invention.
Figure 9B:
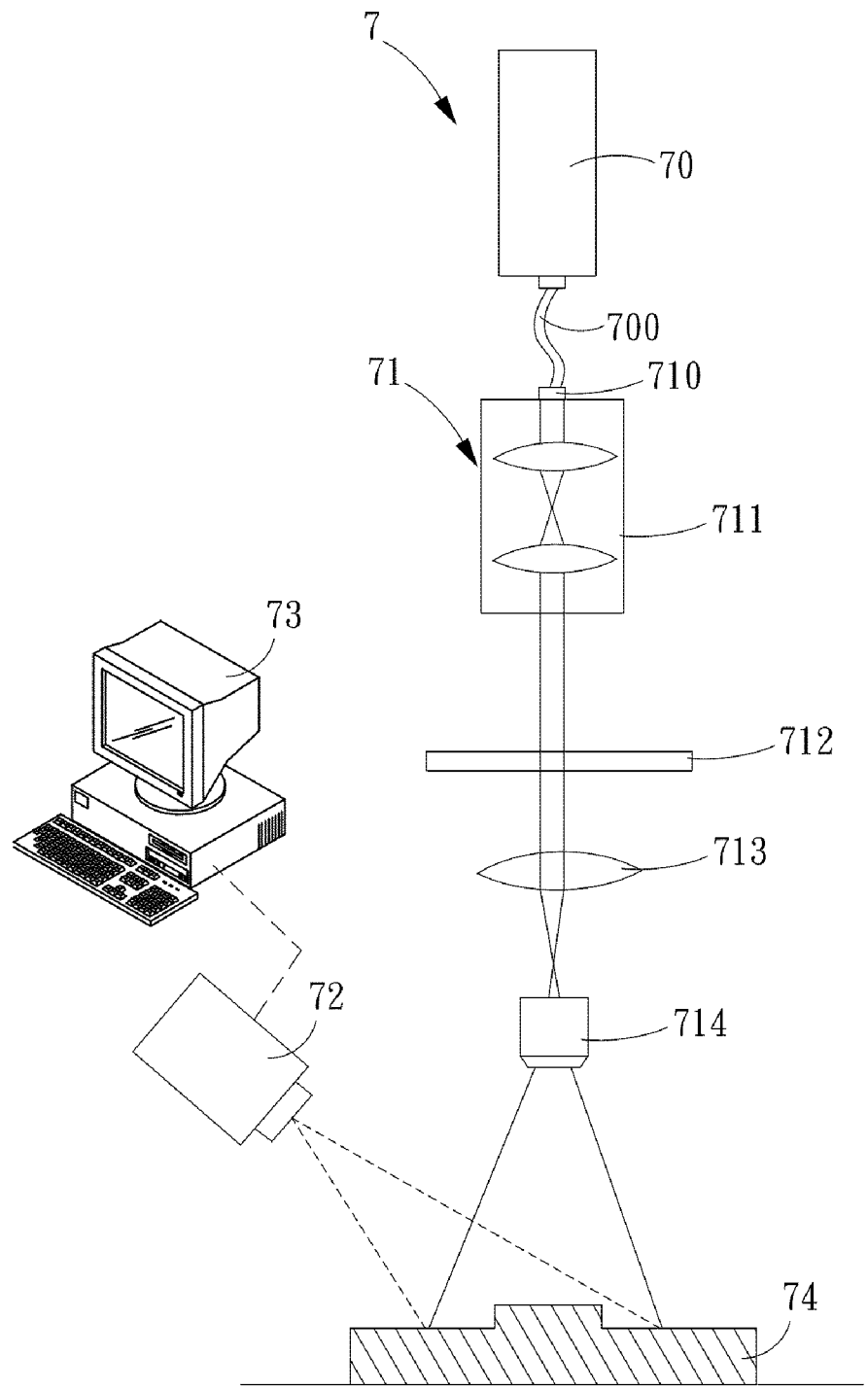
FIG. 9B illustrates another embodiment of a system for measuring three-dimensional surface shape of the present invention.

Please refer to FIG. 9B, which illustrates another embodiment of a system for measuring three-dimensional surface shape of the present invention. The system 7 in the present embodiment is basically similar to the system shown in FIG. 9A, but is different in that the light beam projected from the projection unit 70 of the present embodiment is guided by an optical fiber 700 to a light modulation unit 71 coupled with the optical fiber 700 through an optical coupler 710, wherein the light modulation unit 71 including a collimating lens module 711, an optical grating 712, a lens module 713 and a projector 714. The light beam emitted from the projection unit 70 is collimated by the collimating lens and then is modulated to form the structured light by the optical grating 712. Then the structured light is projected onto the object by means of the lens module and the projector. Moreover, the image acquiring unit 72 is adapted to capture the deformed fringe pattern on the object 74 for forming a fringe image. The control unit 73 is electrically connected to the image acquiring unit 72 for processing the deformed fringe image according to the processes described in FIG. 2 and FIG. 8 so as to obtain a frequency spectrum image, and thereafter, extracts a spectrum information from the frequency spectrum image by employing a band-pass filter shaped to cover the primary and the secondary spectrum regions, and then obtains the corresponding phase information by performing a calculation upon the spectrum information.

Please refer to FIG. 9C and FIG. 9D, which are schematic diagrams showing two different systems for measuring three-dimensional surface shapes that are designed to generate a fringe pattern by optical interferometry. In FIG. 9C, the three-dimensional surface profile measuring system 8 comprises a projection unit 80, a lens module 81, a light modulation unit 82, an imaging acquiring unit 83 and a control unit 84. The projection unit 80 is used for providing a light field to the light modulation unit 82 by the guidance of the lens module 81 and a lens 85a. The light modulation unit 82, being a Mirau interferometer in this embodiment, is used for modulating the light field into a reference beam and a detection beam wherein the detection beam is projected onto an object 89 to form an object beam with a phase information with respect to the surface shape of the object. The object beam interferes with the reference beam thereby forming an interferometric light beam passing through a beam splitter 86 and another lens 85b and is sensed by the image acquiring device 83 so as to form a deformed fringe interferogram. As the Mirau interferometer is known to those skilled in the art, it is not described further herein.

Moreover, the control unit 84 is electrically connected to the image acquiring unit 83 for processing the fringe image according to the processes described in FIG. 2 and FIG. 8 so as to obtain a frequency spectrum image containing a frequency spectrum area having the phase information with respect to the surface shape of the object. The frequency spectrum area has a primary spectrum region and a secondary spectrum region distributed extending from two sides of the primary spectrum region respectively toward the sides of the frequency spectrum image. In addition, the control unit 84 has a spectrum filter, shaped for covering the primary and the second spectrum regions, to extract a spectrum information from the primary and the second spectrum regions and thereafter, restores the phase information by performing a calculation upon the spectrum information and reconstructing the surface shape of the object according to the phase information. The three-dimensional surface profile measuring system shown in FIG. 9D is basically the same as the one shown in FIG. 9C, but is different in that the light modulation unit 82 is a Michelson interferometer. Of course, according to the principle illustrated in FIG. 9C and FIG. 9D, the light modulation unit can be also a Linnik interferometer.

Figure 10B:
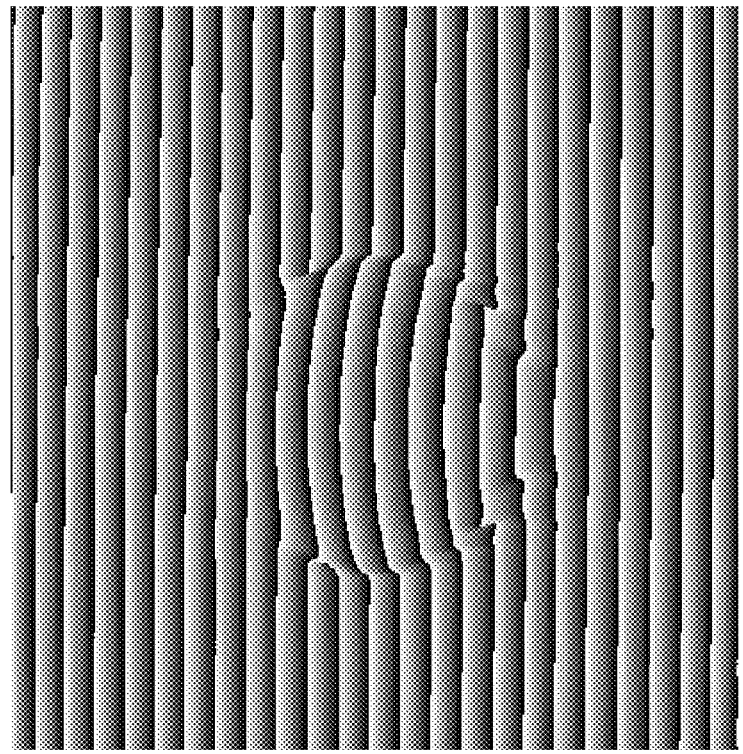
FIG. 10A to 10D illustrate the progress and result for restoring the surface shape of a sphere object according the method for acquiring phase information and system for measuring three-dimensional surface shape by using the rectangular band-pass filter.
Figure 10A:
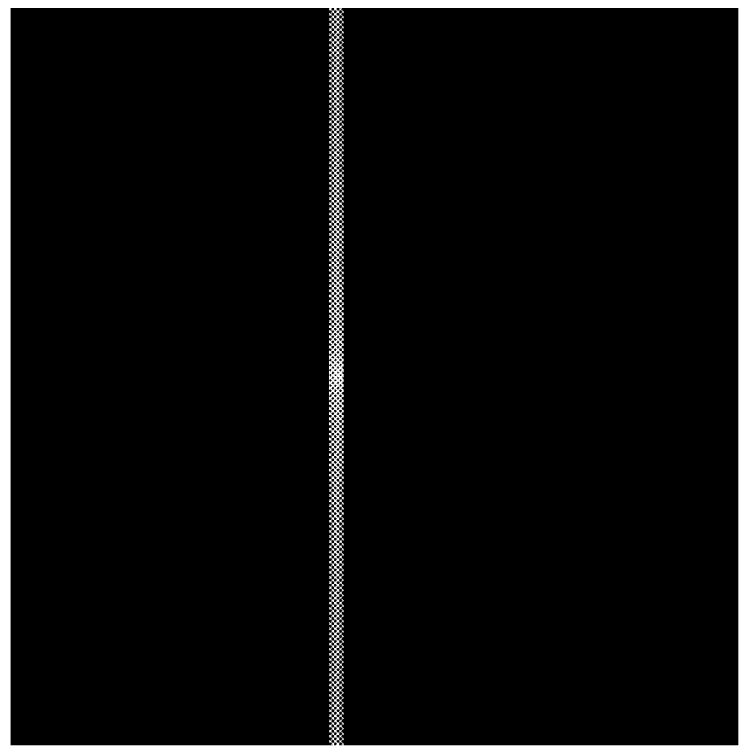
Figure 10D:
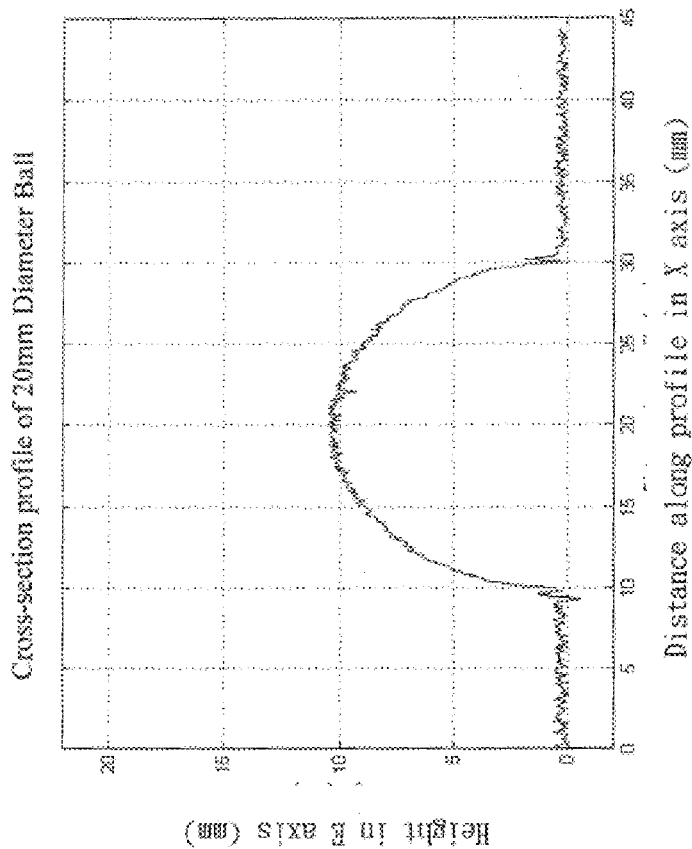
Figure 10C:
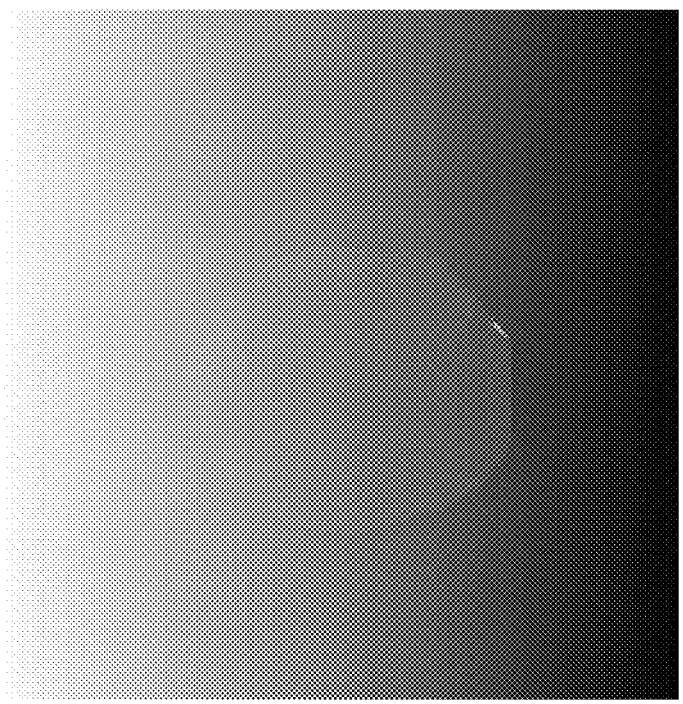

Please refer to FIG. 10A~D, which illustrate the progress and result for reconstructing the surface shape of a sphere object according to the method for acquiring phase information and the system for measuring three-dimensional surface shape by employing the rectangular band-pass filter. In this embodiment, a rectangle-shaped band-pass filter, shown in FIG. 10A, is adapted to extract the spectrum information. Then, the phase information with respect to the surface shape of the sphere object is restored by performing a calculation upon the spectrum information. FIG. 10B illustrates a phase wrapped image obtained by performing an inverse Fourier transformation basing upon the phase information. For reconnecting the discontinuities in the image of FIG. 10B, the Euler transformation and a phase unwrapping process is performed upon the image of FIG. 10B for achieving a continuous phase distribution, as shown in FIG. 10C so that the surface shape of the sphere object can be reconstructed, which is illustrated in FIG. 10D.

Figure 1B:
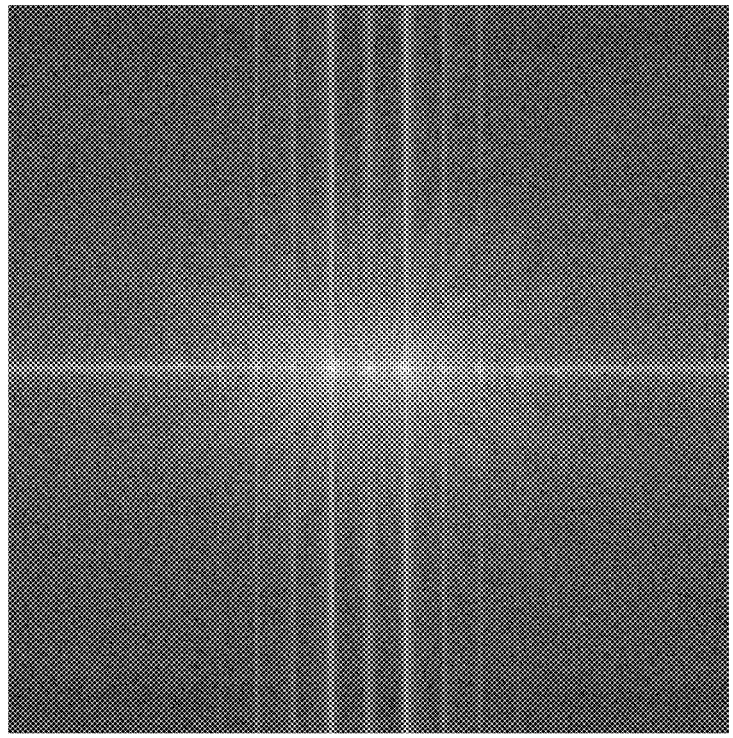
FIG. 1A to FIG. 1G illustrate images with respect to different stages for restoring the surface shape of a sphere object by conventional circular filters.
Figure 1A:
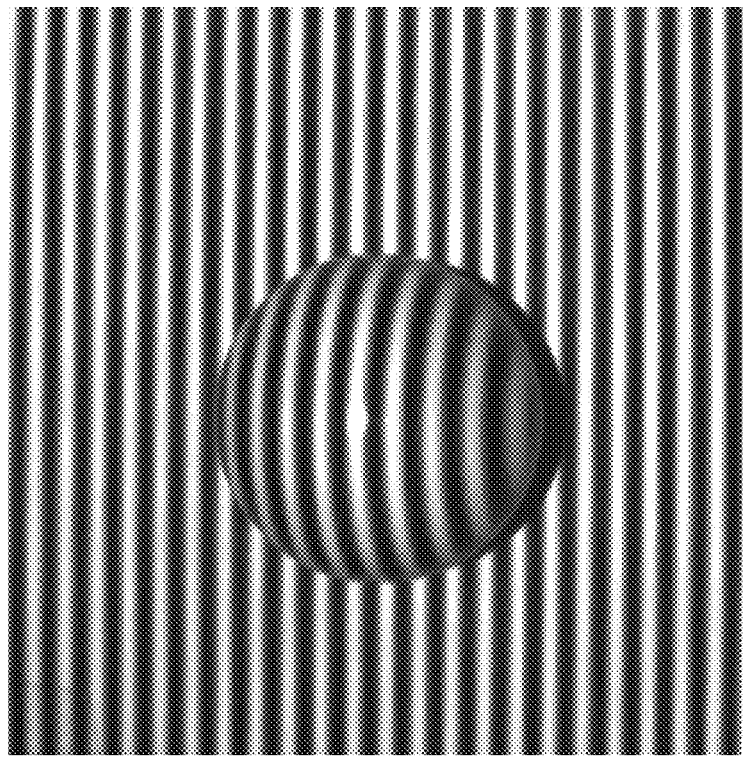
Figure 1D:
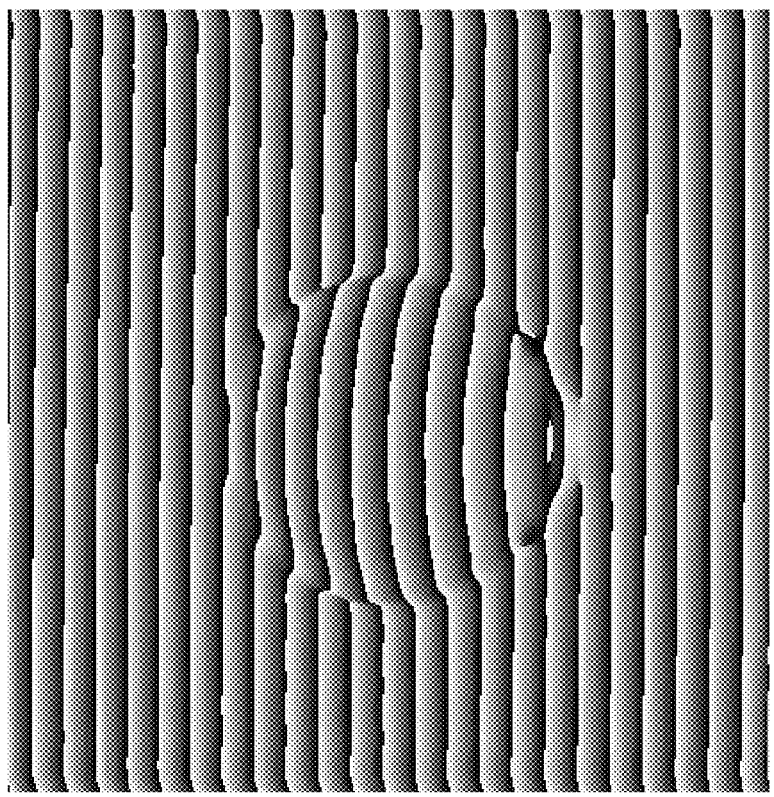
Figure 1C:
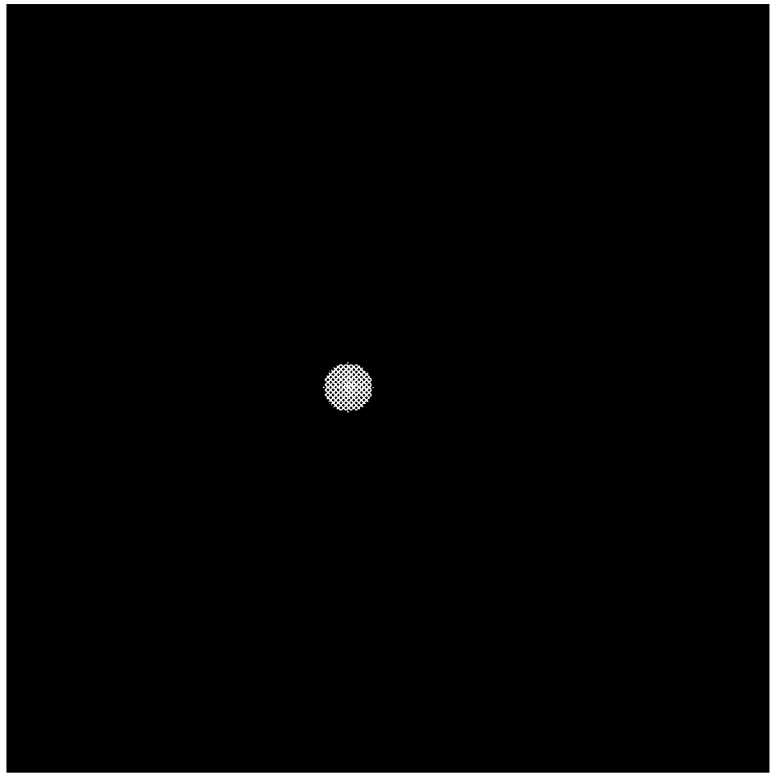
Figures 1E, 1F:
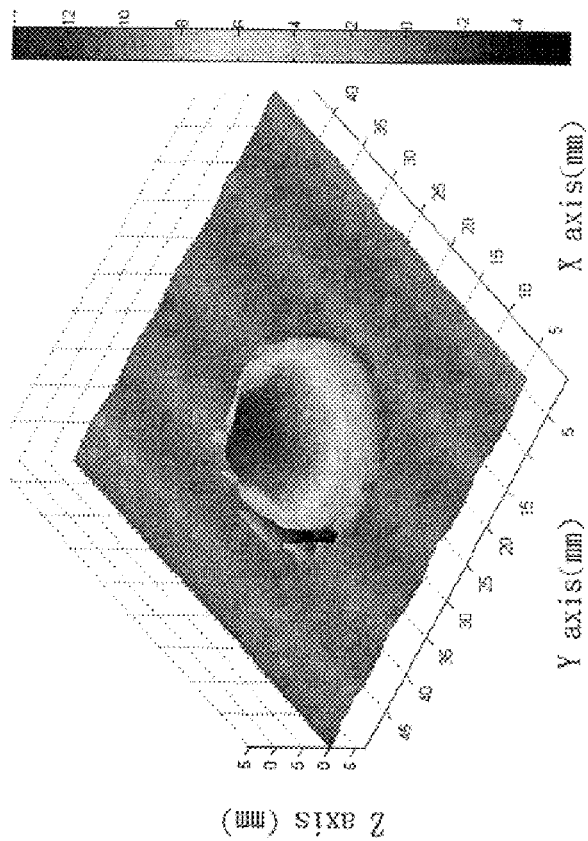
Figure 1G:
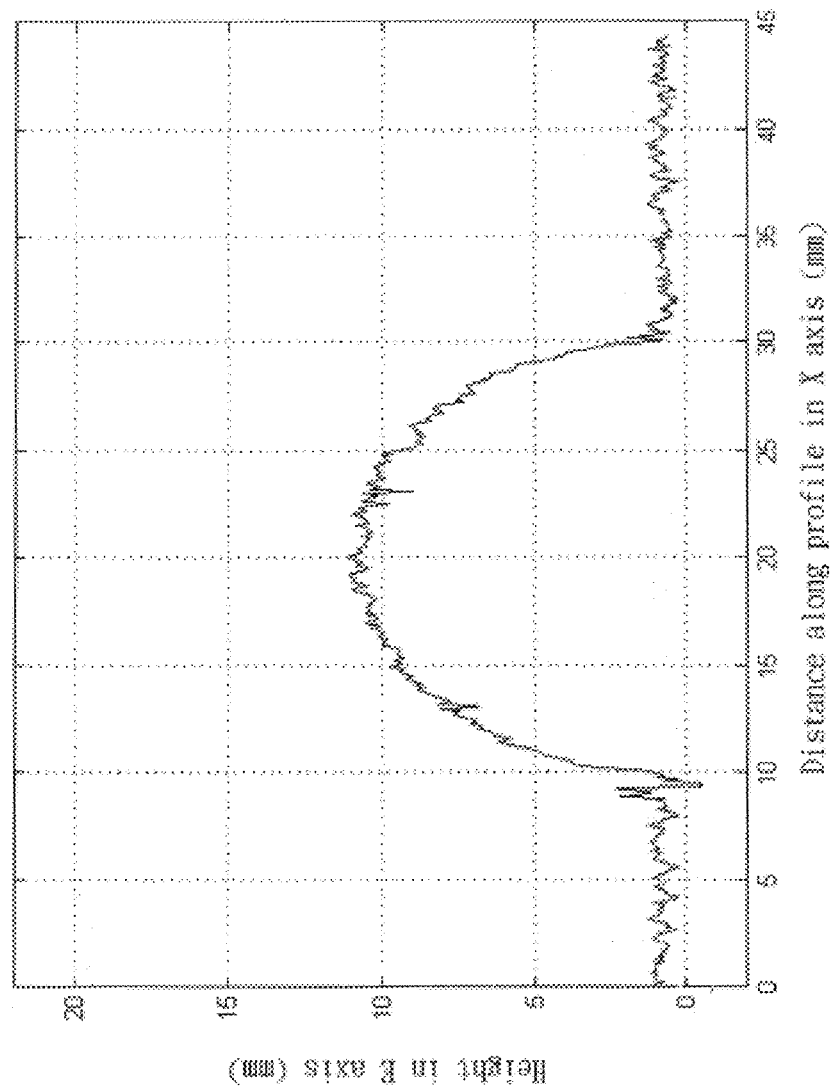
Figure 1I:
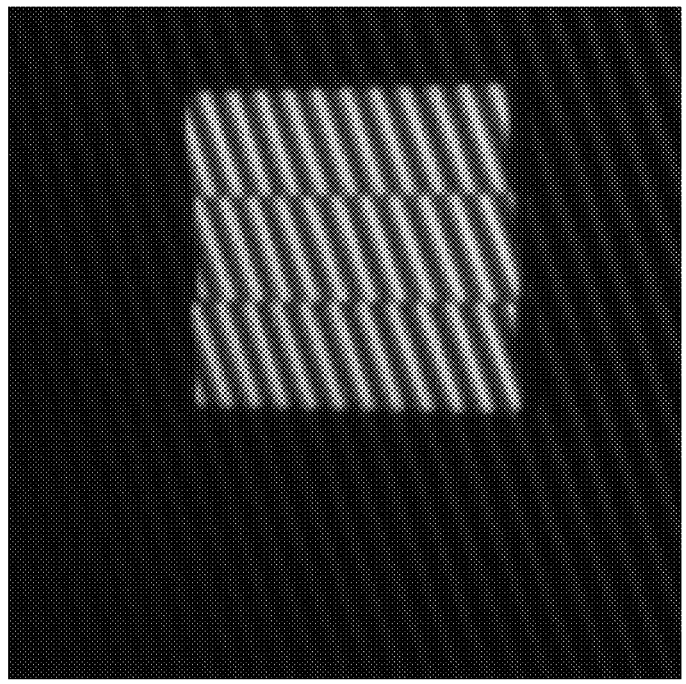
FIG. 1H to FIG. 1L illustrate images with respect to different stages respectively for restoring the surface shape of an overlapping step-height gauge block by conventional circular band-pass filters.
Figure 11B:
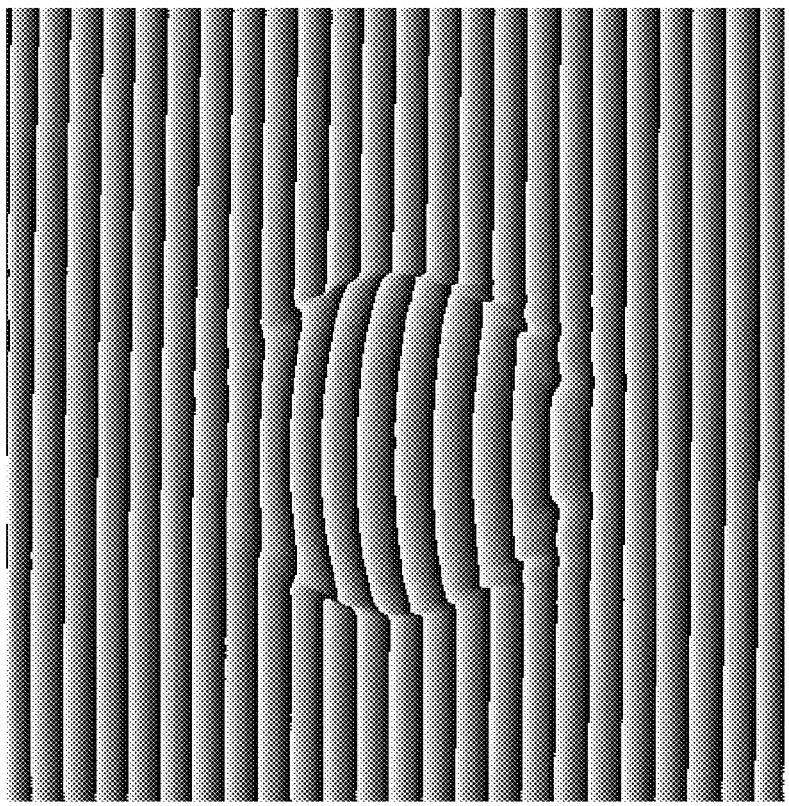
FIG. 11A to 11E illustrate the progress and result for restoring the surface shape of a sphere object according the method for acquiring phase information and system for measuring three-dimensional surface shape by employing the oval-shaped band-pass filter.
Figure 11A:
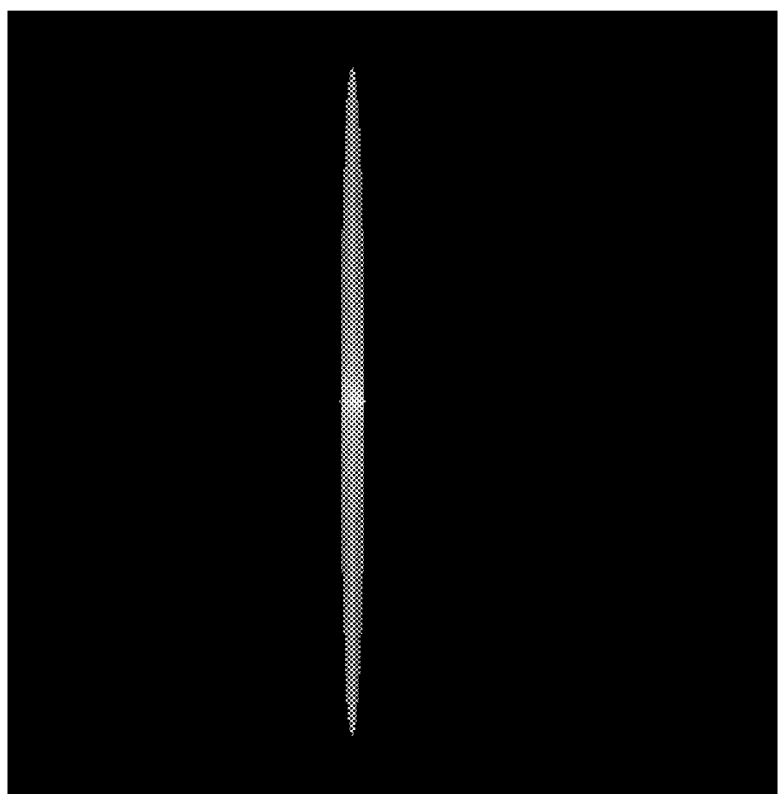
Figure 11D:
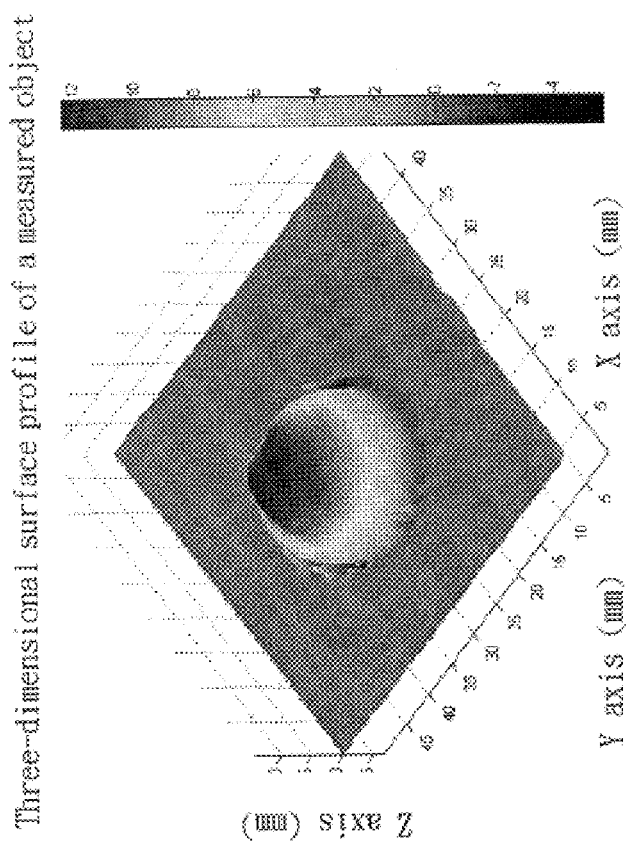
Figure 11C:
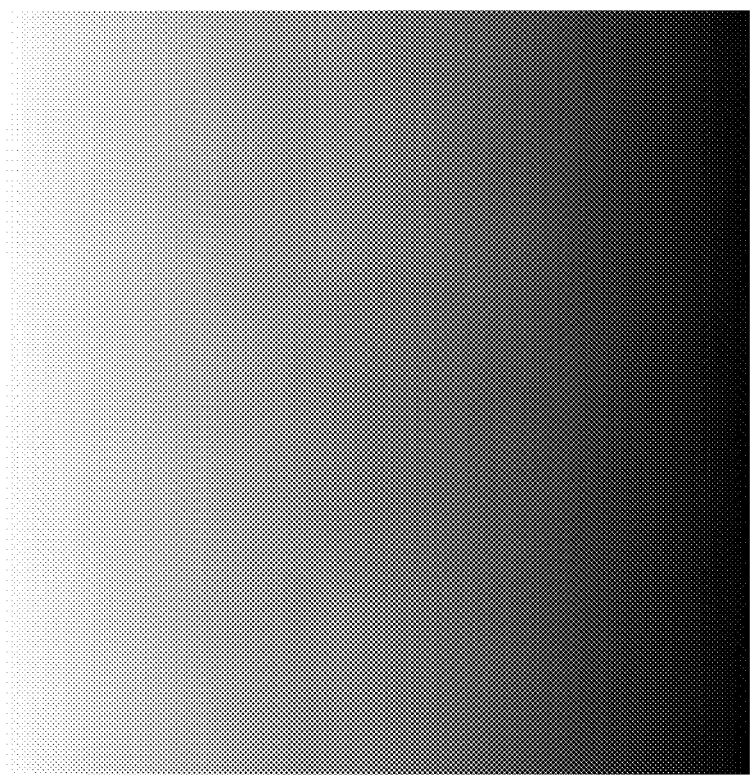
Figure 11E:
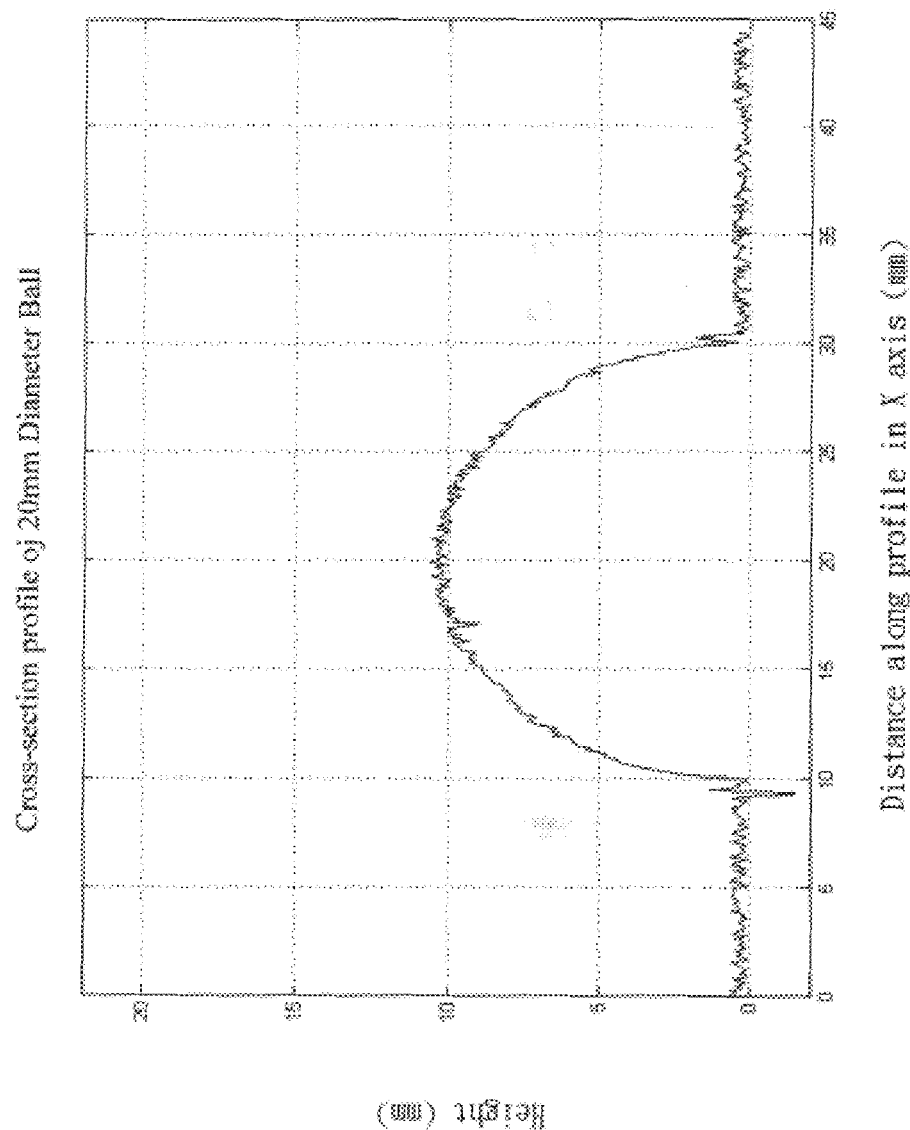

Please refer to FIG. 11A~E, which illustrate the progress and result for reconstructing the surface shape of a sphere object according to the method for acquiring phase information and system for measuring three-dimensional surface shape by employing the oval-shaped band-pass filter. In this embodiment, the oval-shaped band-pass filter, shown in FIG. 11A, is adapted to extract the spectrum information from the first order spectrum area within the spectrum information image shown in FIG. 1B. Then, the phase information with respect to the surface shape of the sphere object is restored by performing a calculation upon the spectrum information. FIG. 11B illustrates a corresponding phase wrapping image obtained by performing an inverse Fourier transformation basing upon the phase information. For reconnecting the discontinuities in the image of FIG. 11B, the Euler transformation and a phase unwrapping process is performed upon the image of FIG. 11B for achieving a continuous phase distribution, as shown in FIG. 11C so that the surface shape of the sphere object can be reconstructed, which is illustrated in FIGS. 11D and 11E.

Figure 12B:
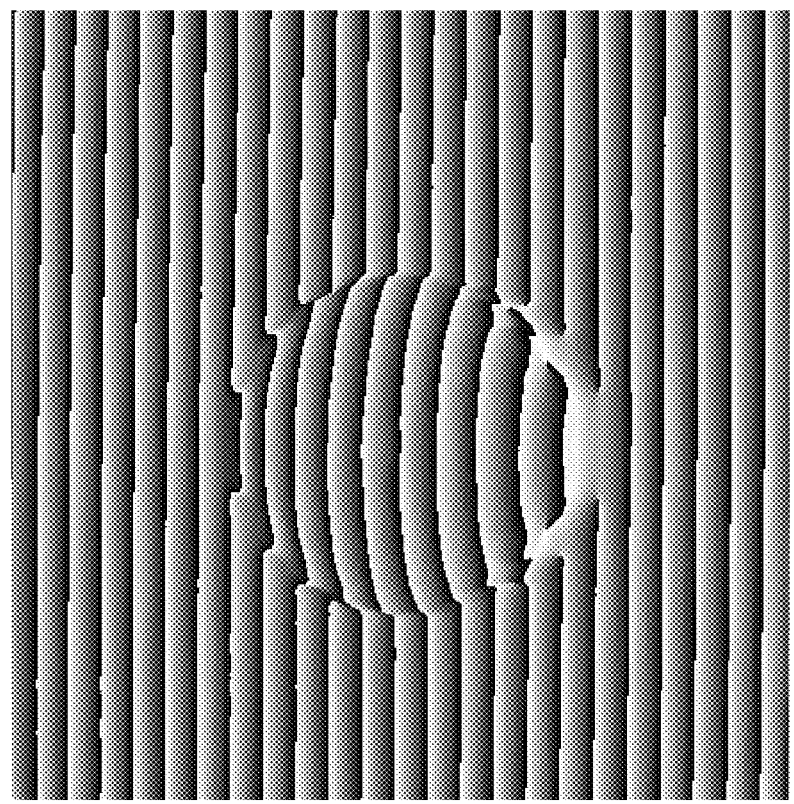
FIG. 12A to 12E illustrate the progress and result for restoring the surface shape of a sphere object according the method for acquiring phase information and system for measuring three-dimensional surface shape with the filter shaped by combining oval-shaped and rectangular filter.
Figure 12A:
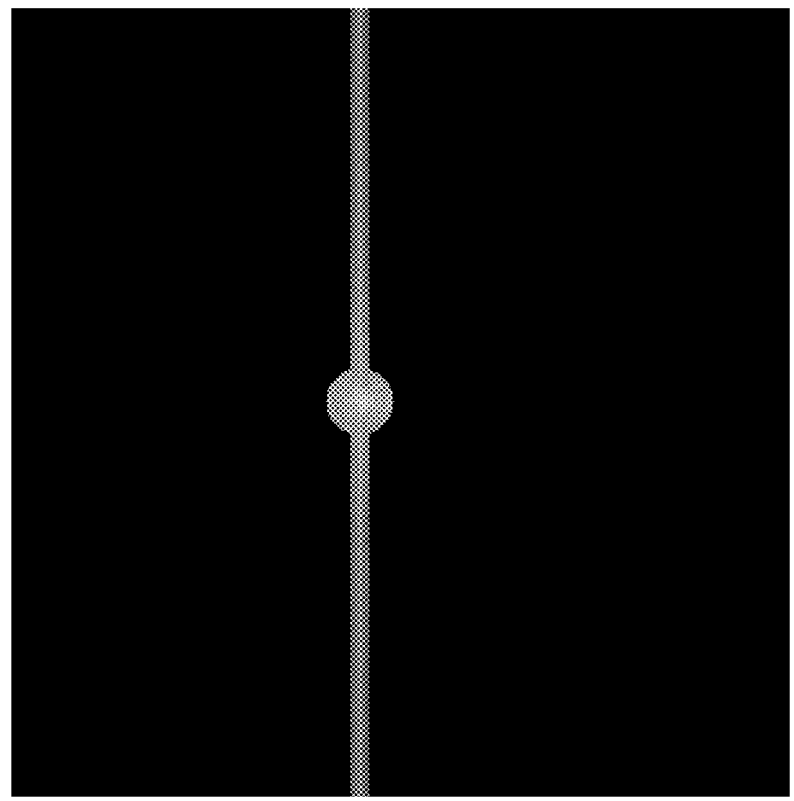
Figure 12D:
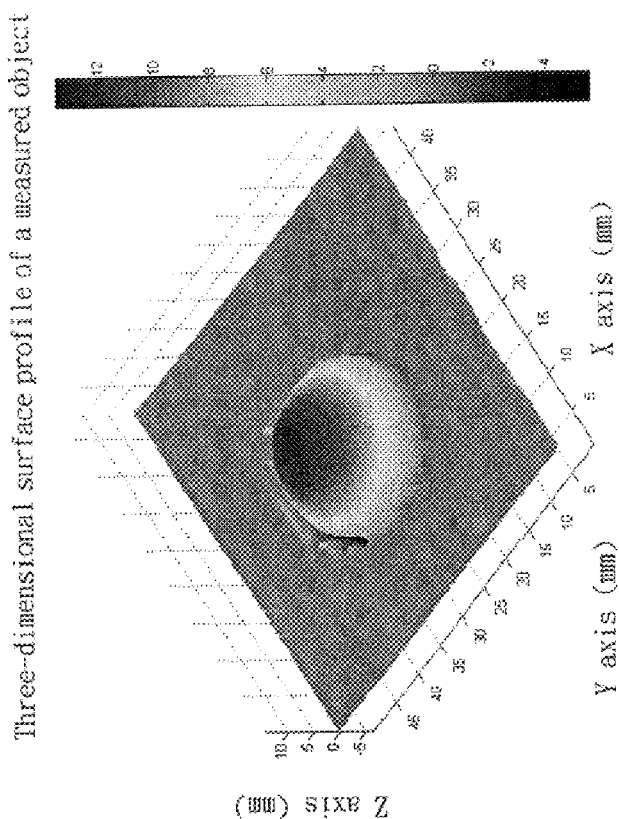
Figure 12C:
Figure 12E:
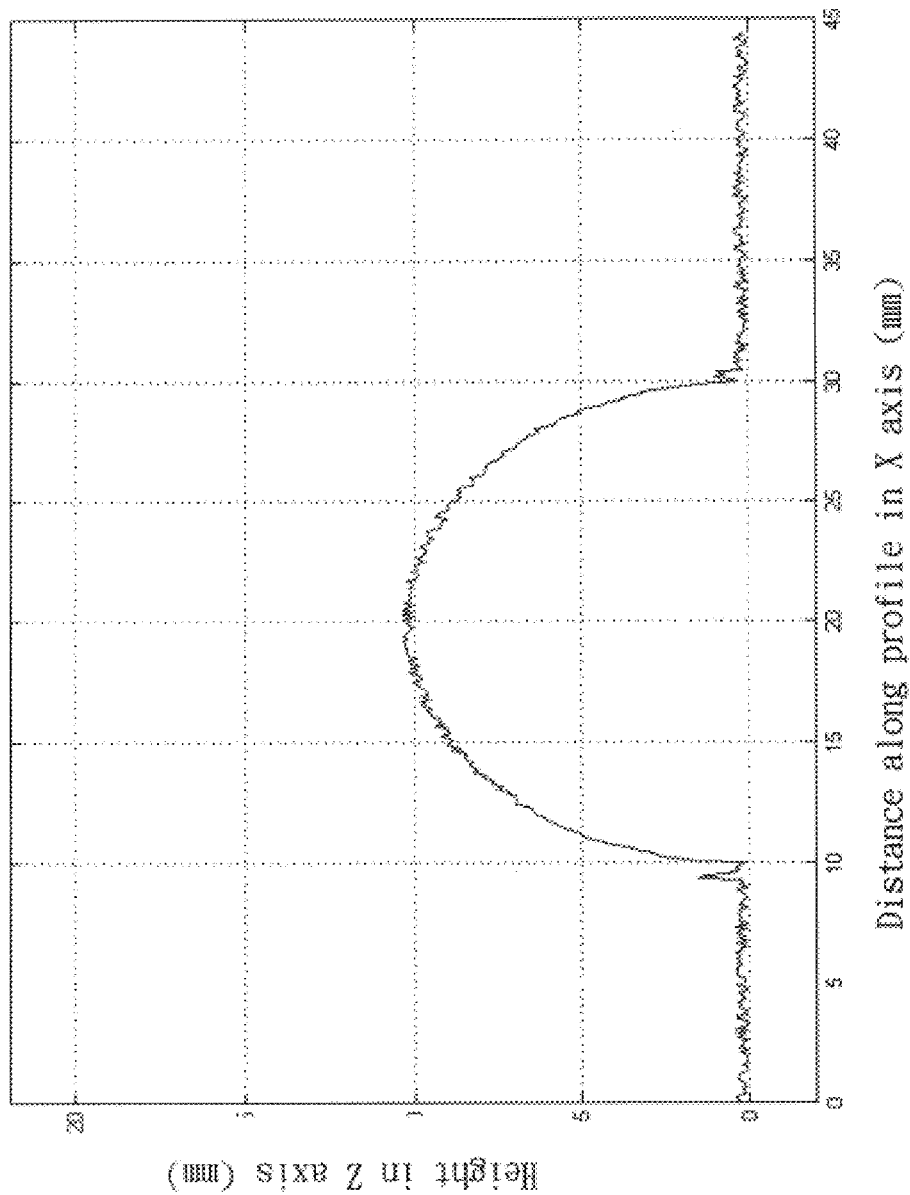
Figure 13B:
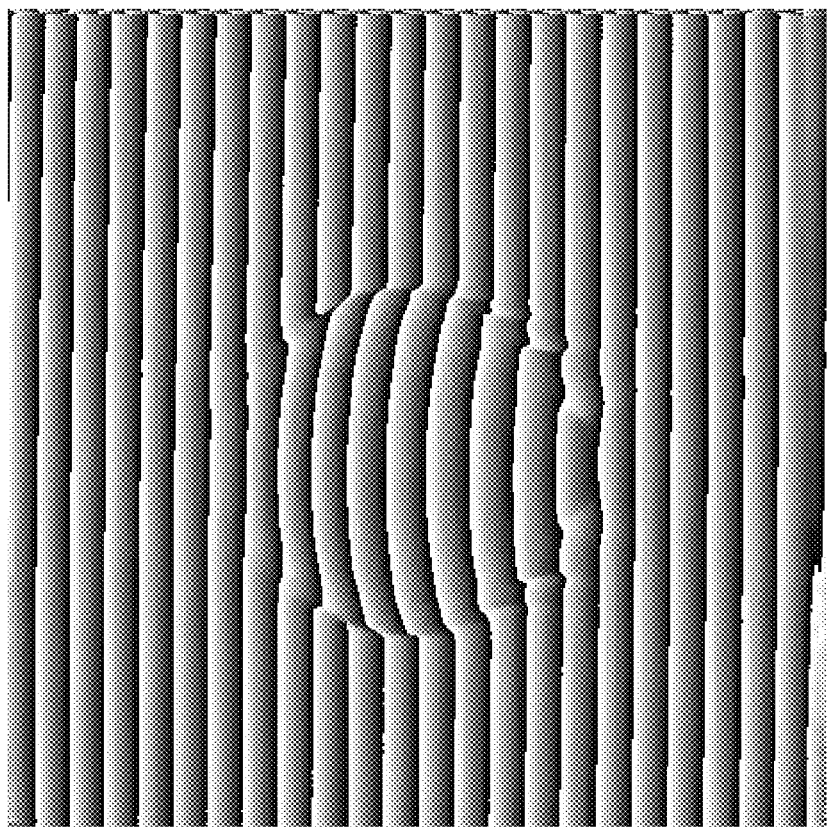
FIG. 13A to 13D illustrate the progress and result for restoring the surface shape of a sphere object according the method for acquiring phase information and system for measuring three-dimensional surface shape by employing the diamond-shaped filter.
Figure 13A:
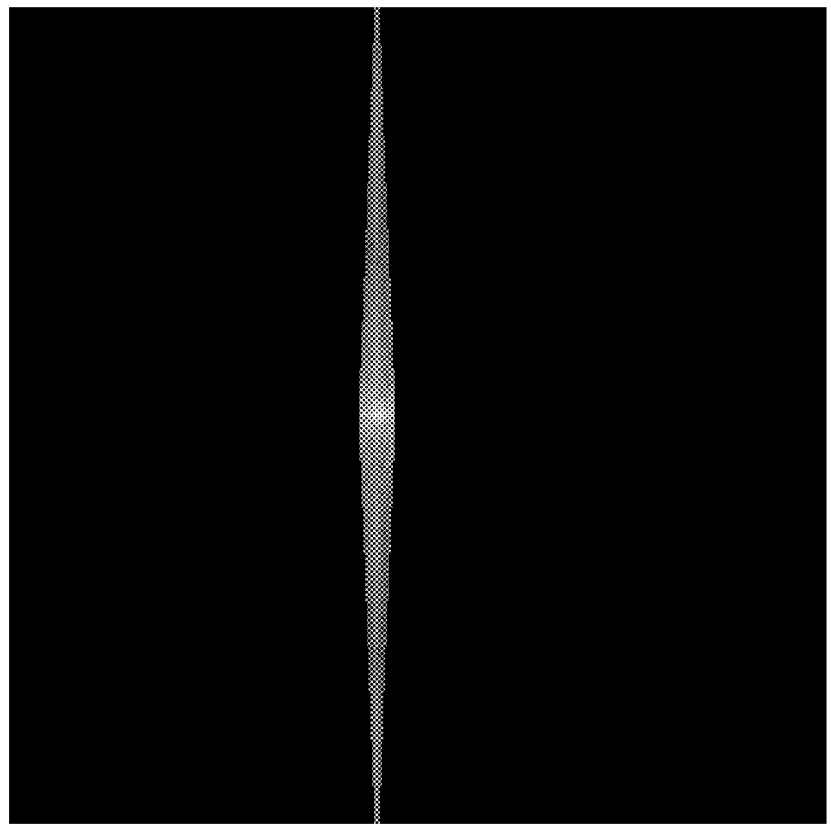
Figure 13D:
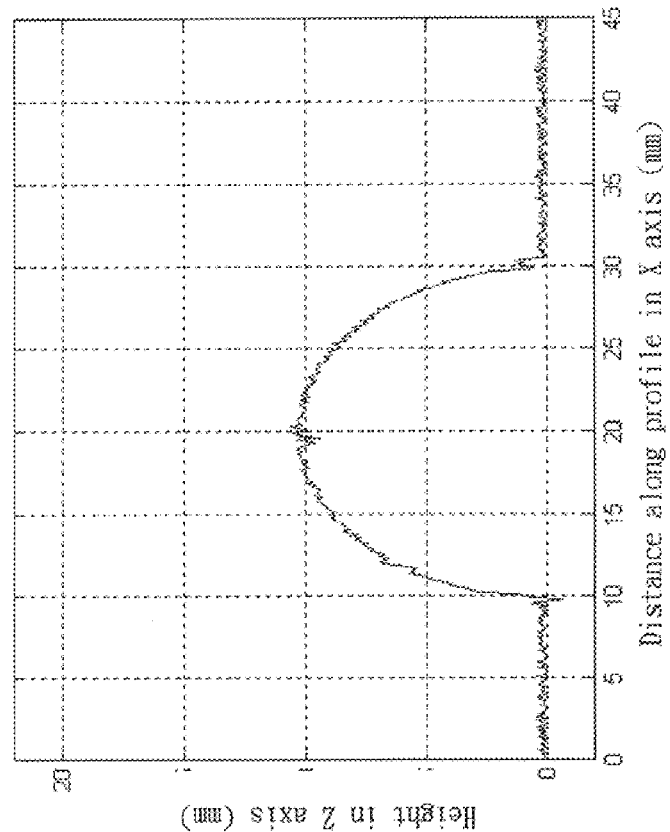
Figure 13C:
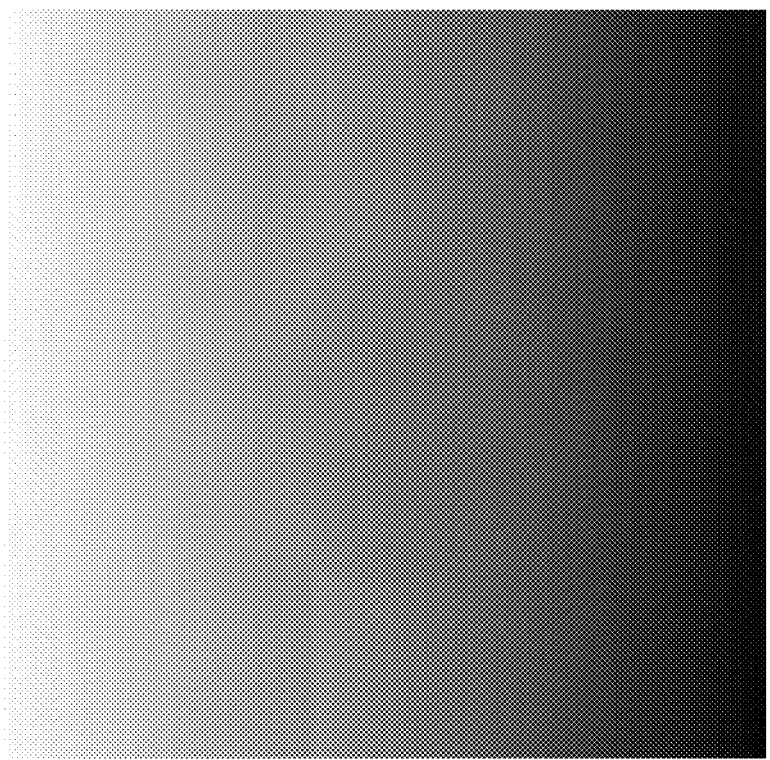

Please refer to FIG. 12A~E, which illustrate the progress and result for reconstructing the surface shape of a sphere object according to the method for acquiring phase information and the system for measuring three-dimensional surface shape with a filter shaped by combining the circular shape and rectangular shape. In this embodiment, the band-pass filter shaped by combining the circular shape and rectangular shape, shown in FIG. 12A, is adapted to extract the spectrum information from the first order spectrum area within the spectrum information image. Then, the phase information with respect to the surface shape of the sphere object is restored by performing a calculation upon the spectrum information. FIG. 12B illustrates a corresponding wrapped phase image obtained by performing an inverse Fourier transformation basing upon the phase information. For reconnecting the discontinuities in the image of FIG. 12B, the Euler transformation and a phase unwrapping process is performed upon the image of FIG. 12B for achieving a continuous phase distribution, as shown in FIG. 12C so that the surface shape of the sphere object can be reconstructed, which is illustrated in FIGS. 12D and 12E.

Please refer to FIG. 13~D, which illustrate the progress and result for reconstructing the surface shape of a sphere object according to the method for acquiring phase information and the system for measuring three-dimensional surface shape by the diamond-shaped filter. In this embodiment, the diamond-shaped band-pass filter, shown in FIG. 13A, is adapted to extract the spectrum information. Then, the phase information with respect to the surface shape of the sphere object is restored by performing a calculation upon the spectrum information. FIG. 13B illustrates a wrapped phase image obtained by performing an inverse Fourier transformation basing upon the phase information. For reconnecting the discontinuities in the image of FIG. 13B, the Euler transformation and a phase unwrapping process is performed upon the image of FIG. 13B for achieving a continuous phase distribution, as shown in FIG. 13C so that the surface shape of the sphere object can be reconstructed, which is illustrated in FIG. 13D.

Please refer to table 1 and table 2 listed hereinafter, which show respectively the reconstruction errors in degree of sphericity relating to the measurement of a reference sphere object by the use of the conventional circular band-pass filter and the other band-pass filters proposed in the present invention, and the errors in flatness degree relating to the measurement of a reference standard plane by the use of the conventional circular band-pass filter and the other band-pass filters proposed in the present invention. According to the results shown in table 1 and table 2, the performance of all the band-pass filters proposed in the present invention is superior to the conventional circular band-pass filter.

TABLE 1

| Type of band-pass filter | Errors in degree of sphericity relating to the measurement of a reference standard ball (diameter = 20 mm ± 0.00025 mm) |
|---|---|
| circular | 0.324 mm |
| rectangle | 0.192 mm |
| diamond | 0.175 mm |
| oval | 0.167 mm |
| the shape combining circular and rectangle | 0.123 mm |

TABLE 2

| Type of band-pass filter | Errors in flatness relating to the measurement of an overlapped precision block gage |
|---|---|
| circular | 0.135 mm |
| rectangle | 0.073 mm |
| diamond | 0.072 mm |
| oval | 0.061 mm |
| the shape combining circular and rectangle | 0.055 mm |

Please refer to table 3 listed hereinafter, which shows the reconstruction errors in diameter of the sphere object and surface area size relating to the measurement of a reference sphere by the use of the conventional circular band-pass filter and the other band-pass filters proposed in the present invention. In table 3, $d_0$ represents the actual diameter of the sphere object; d represents the diameter measured from the reconstructed profile of the sphere object; $A_0$ represents the actual surface area of the sphere object; and A represents the surface area size of the reconstructed sphere object. According to the results shown in table 3, the performance of all the band-pass filters proposed in the present invention is better than the conventional circular band-pass filter.

TABLE 3

| Type of band-pass filter | average diameter error | diameter error ratio $\left(\frac{d_0 - \bar{d}}{d_0}\%\right)$ | surface area ratio $\left(\frac{A}{A_0}\%\right)$ |
| --- | --- | --- | --- |
| circular | 1.0968 mm | 5.484% | 89.33% |
| rectangle | 0.789 mm | 3.945% | 92.26% |
| diamond | 0.764 mm | 3.82% | 92.51% |
| Oval | 0.723 mm | 3.615% | 92.89% |
| the shape combining circular and rectangle | 0.618 mm | 3.09% | 93.92% |

Figure 1H:
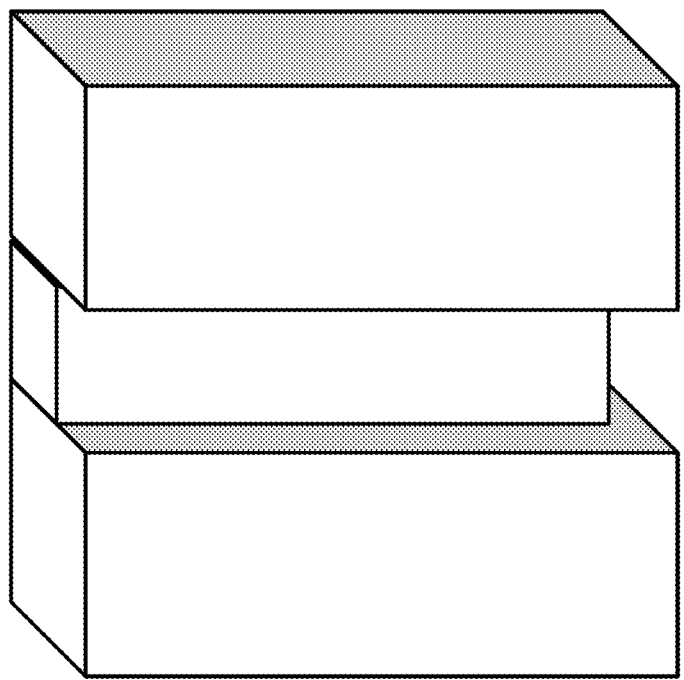
Figure 1K:
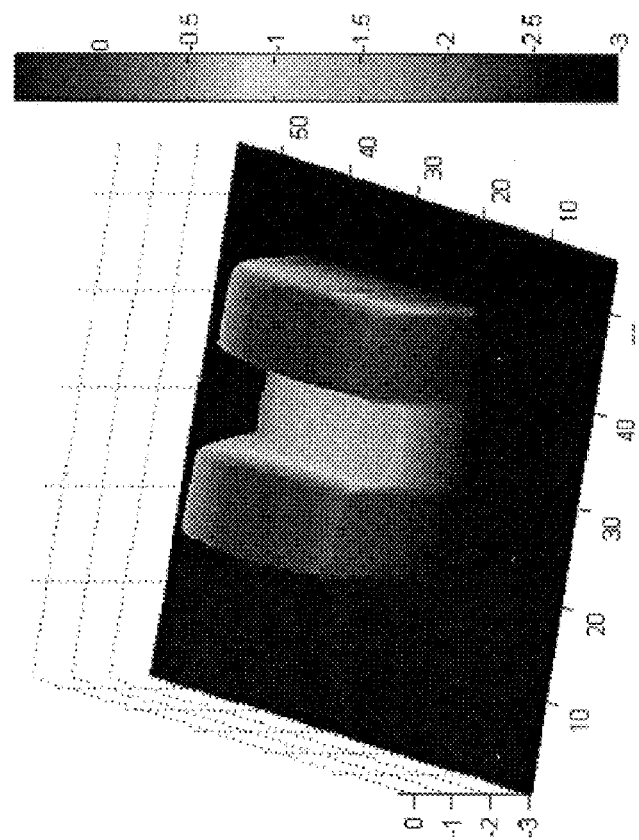
Figure 1J:
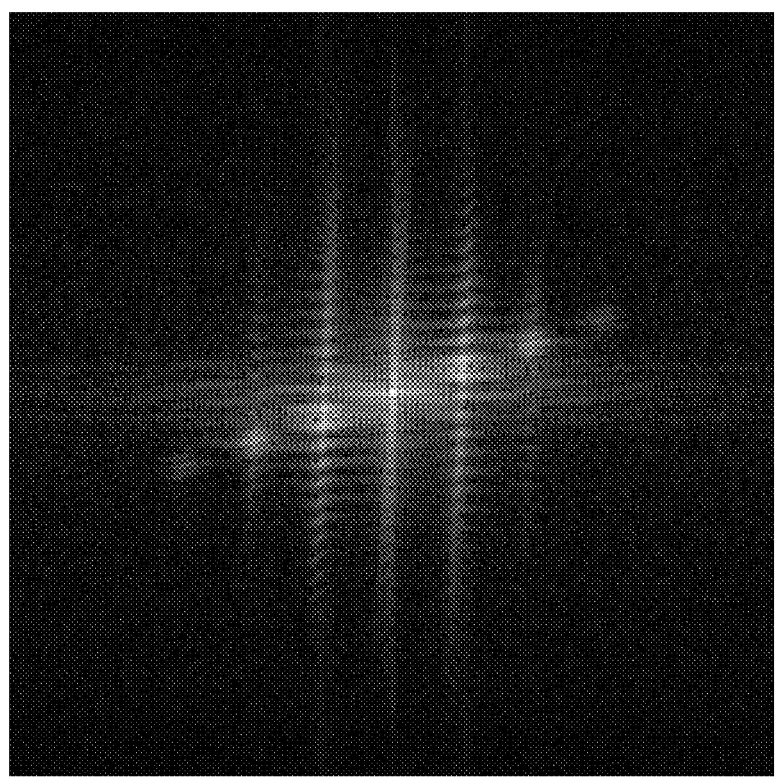
Figure 1L:
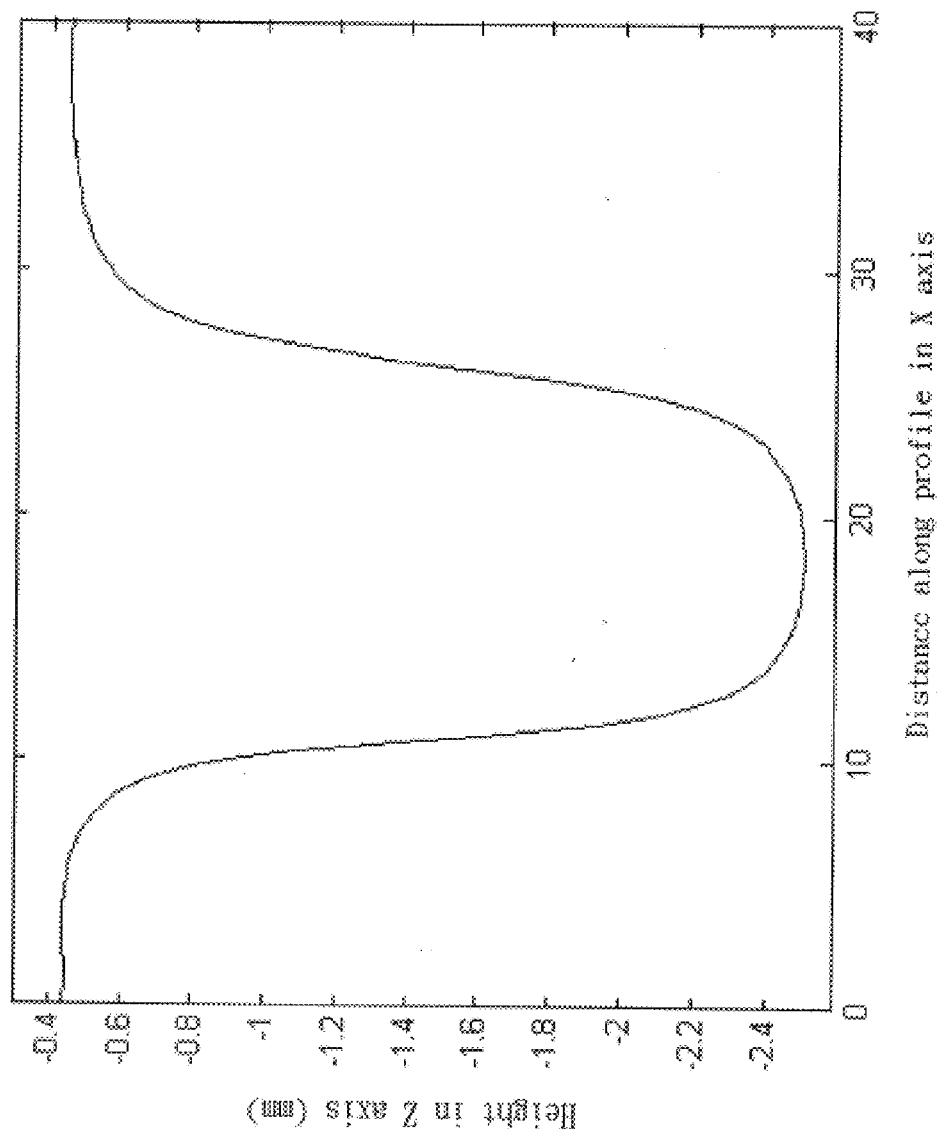
Figure 14B:
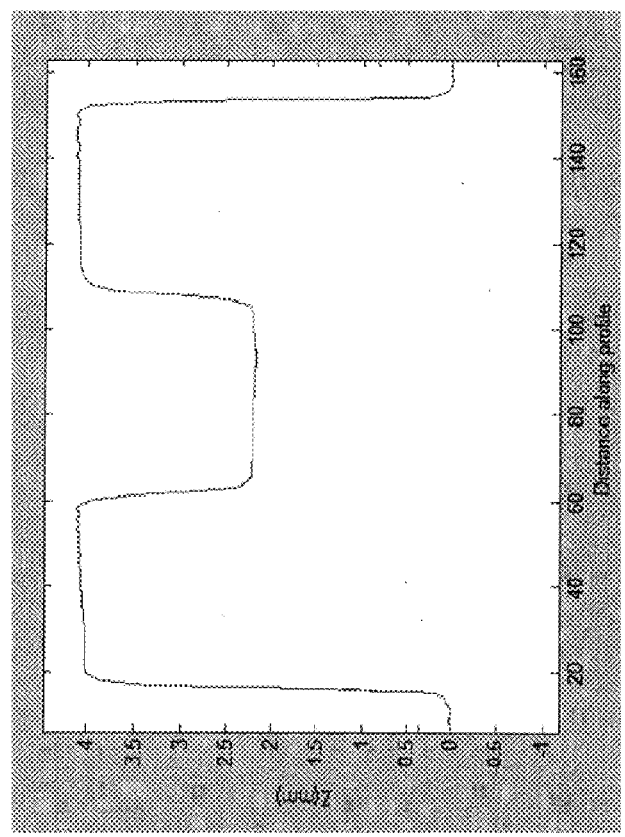
FIG. 14A to 14B illustrate the restoring result with respect to the structure shown in FIG. 1H by using the full range band-pass filter of the present invention.
Figure 14A:
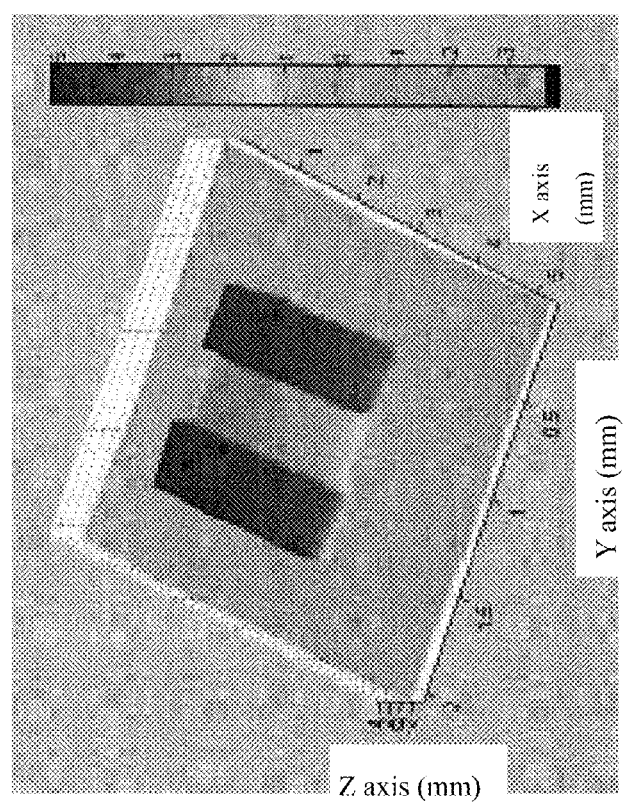

Please refer to FIG. 14A and FIG. 14B, which illustrates the restoring result with respect to the object structure shown in FIG. 1H by using the full range band-pass filter of the present invention. As the band-pass filter used in the present invention is designed to cover the +1 order or −1 order frequency spectrum areas within the frequency spectrum image of FIG. 1H, the complete spectrum information for restoring the phase information with respect to the surface shape of the object can be obtained. Therefore, all the right angles on the overlapped step-height gauge block of FIG. 1H can be reconstructed properly. Comparing the sectional profile shown in FIG. 14B, which is resulting from the use of the band-pass filter of the present invention, with the sectional profile shown in FIG. 1L, which is resulting from the conventional filter, the accuracy of the filter of the present invention is obviously much better.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for acquiring phase information comprising the steps of:
   obtaining a deformed fringe image related to a first phase information with respect to a first surface shape information of an object;
   acquiring a first frequency spectrum image with respect to the deformed fringe image, wherein the first frequency spectrum image has a first frequency spectrum area corresponding to the first phase information with respect to the first surface shape information of the object and having a first primary spectrum region and a first secondary spectrum region distributed extending from two sides of the first primary spectrum region respectively toward the sides of the first frequency spectrum image;
   extracting a first spectrum information from the first primary spectrum region and the first secondary spectrum region by employing an oval-shaped filter shaped to cover the first primary and the first secondary spectrum regions, wherein a length of a long axis of the oval-shaped filter is half of an image length of the first frequency spectrum image measured along a first direction; and
   obtaining the first phase information by performing a calculation upon the first spectrum information.

2. The method of claim 1, wherein the center of the oval-shaped filter is located at a local maximum of the first frequency spectrum area having the first phase information.

3. The method of claim 1, wherein a length of a short axis of the oval-shaped filter is less than or equal to a minimum distance measured from a local maximum of the first frequency spectrum area to a point located on an extension along the first direction, wherein the extension is extended from a point of an adjacent frequency spectrum area nearest to the first frequency spectrum area.

4. The method of claim 1, wherein the deformed fringe image is formed by projecting a structured light at an included angle ranging from 0 to 180 degrees onto the object.

5. The method of claim 1, wherein the deformed fringe image is formed by interfering a reference beam with an object beam having the first phase information with respect to the first surface shape information of the object through an optical interference system.

6. The method of claim 1, further comprising a process for optimizing the filter and the optimizing process including the steps of:
   extracting a second spectrum information from a second frequency spectrum area having a second phase information within a second frequency spectrum image with respect to a reference sphere having at least one reference characteristic by a reference filter having specific size, wherein the second frequency spectrum area has a second primary spectrum region and a second secondary spectrum region distributed extending from two sides of the second primary spectrum region respectively toward sides of the second frequency spectrum image;
   performing a calculation upon the second spectrum information for obtaining the second phase information with respect to the reference sphere;
   obtaining at least one measured characteristic associated with the reference sphere by restoring the second phase information with respect to the reference sphere;
   changing the size of the reference filter and repeating the foregoing three steps in a plurality of times for obtaining a plurality of sets of at least one measured characteristic of the reference sphere corresponding to the reference filters having a different size respectively;
   comparing the at least one reference characteristic of the reference sphere with each of the at least one of the measured characteristic respectively; and
   selecting the reference filter having the smallest difference between the corresponding measured characteristic and the reference characteristic as a band-pass filter.

7. The method of claim 6, wherein the measured characteristic is a value selected from the group consisting of degree of sphericity, radius, and the combination thereof.

8. A system for measuring three-dimensional surface shape, comprising:
   a projection unit, for projecting a structured light onto an object;
   an image acquiring device, for acquiring a deformed fringe image having a phase information with respect to surface shape information of an object; and
   a control unit, coupled to the image acquiring device for processing the deformed fringe image so as to obtain a frequency spectrum image, which has a frequency spectrum area corresponding to the phase information with respect to the surface shape information of the object and has a primary spectrum region and a secondary spectrum region distributed extending from two sides of the primary spectrum region respectively toward the sides of the frequency spectrum image, extracting spectrum information from the primary spectrum region and the secondary spectrum region by employing an oval-shaped filter shaped to cover the primary and the secondary spectrum regions, and then obtaining the phase information by performing a calculation upon the spectrum information, wherein a length of a long axis of the oval-shaped filter is half of an image length of the frequency spectrum image measured along a first direction.

9. The system of claim 8, wherein the projection unit further comprises:
   a light projecting unit, for providing an object beam; and
   a light modulation unit, for modulating the object beam into the structured light and projecting the structured light onto the object.

10. The system of claim 9, wherein the light modulation unit has an optical grating.

11. The system of claim 8, wherein the fringe projection unit is a digital light processing (DLP) unit or a liquid crystal on silicon (LCOS) unit.

12. A system for measuring three-dimensional surface shape, comprising:
   a light projection unit, for providing a light field;
   a light modulation unit, for modulating the light field into a reference beam and a detection beam and projecting the detection beam onto an object so that an object beam containing a phase information with respect to a surface shape information of the object is formed to interfere with the reference beam, thereby forming an interference beam;
   an image acquiring device, for detecting the interference beam so as to form a deformed fringe image; and
   a control unit, coupled to the image acquiring device for processing the deformed fringe image so as to obtain a frequency spectrum image, which has a frequency spectrum area corresponding to the phase information with respect to the surface shape information of the object and has a primary spectrum region and a secondary spectrum region distributed extending from two sides of the primary spectrum region respectively toward sides of the frequency spectrum image, extracting a spectrum information from the primary spectrum region and the secondary spectrum region by employing an oval-shaped filter shaped to cover the primary and the secondary spectrum regions, and then obtaining the phase information by performing a calculation upon the spectrum information, wherein a length of a long axis of the oval-shaped filter is half of an image length of the frequency spectrum image measured along a first direction.

13. The system of claim 12, wherein the light modulation unit is a Michelson interferometer.

14. The system of claim 12, wherein the light modulation unit is a Mirau interferometer.

15. The system of claim 12, wherein the light modulation unit is a Linnik interferometer.

* * * * *